United States Statutory Invention Registration [19]

[11] Reg. Number: H972

Inoue

[43] Published: Oct. 1, 1991

[54] DIRECT POSITIVE COLOR PHOTOGRAPHIC MATERIALS

[75] Inventor: Noriyuki Inoue, Ashigara, Japan Co., Ltd., 210, Nakanuma, Minami Ashigara-shi, Kanagawa, Japan

[73] Assignee: Fuji Photo Film Co., Ltd. Kanagawa, Japan

[21] Appl. No.: 255,285

[22] Filed: Oct. 11, 1988

[30] Foreign Application Priority Data

Oct. 8, 1987 [JP] Japan ..... 62-254476

[51] Int. Cl.[5] ..... G03C 1/08

[52] U.S. Cl. ..... 430/558; 430/410; 430/598; 430/596

[58] Field of Search ..... 430/558, 410, 598, 596

[56] References Cited

U.S. PATENT DOCUMENTS

| | | | |
|---|---|---|---|
| 4,481,285 | 11/1984 | Takagi et al. | 430/410 |
| 4,540,654 | 9/1985 | Sato et al. | 430/381 |
| 4,704,350 | 11/1987 | Morigaki et al. | 430/558 |
| 4,789,627 | 12/1988 | Inoue et al. | 430/410 |

FOREIGN PATENT DOCUMENTS 0283040 9/1988 European Pat. Off. .

*Primary Examiner*—Robert L. Stoll
*Assistant Examiner*—Greg M. Sweet
*Attorney, Agent, or Firm*—Sughrue, Mion, Zinn, Macpeak and Seas

[57] ABSTRACT

A direct positive color photosensitive material comprising an internal latent image silver halide emulsion layer which has not been prefogged, a color image-forming magenta coupler of formula (I) and a nucleation accelerator of formulae (II) and/or (III):

(I)

wherein Za and Zb represent a group, $R^1$ and $R^2$ represent a hydrogen atom or a substituent group, X represents a hydrogen atom or a group which can be eliminated by a coupling reaction, and $R^1$, $R^2$ or X may form dimers or larger polymers;

(II)

wherein Q represents a group of atoms required to form a 5- or 6-membered heterocyclic ring, Y represents a dilvalent linking group containing at least one atom selected from hydrogen, carbon, nitrogen, oxygen and sulfur, and R represents an organic group which contains at least one thioether group, amino group, ammonium group, ether group or heterocyclic group, n represents 0 or 1 and m represents 0, 1 or 2, and M represents a hydrogen atom, an alkali metal atom, an ammonium group or a group which is cleaved under alkaline conditions;

(III)

wherein Q′ represents a group of atoms required to form a 5- or 6-membered heterocyclic ring which can form imino silver, Y, R, n and M are the same as for general formula (I) and m′ represents 1 or 2.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DIRECT POSITIVE COLOR PHOTOGRAPHIC MATERIALS

FIELD OF THE INVENTION

This invention concerns silver halide photographic materials, more precisely, it concerns direct positive color photographic materials which have good color rendition and improved image whiteness.

BACKGROUND OF THE INVENTION

A photographic method in which direct positive images are obtained without the need for reversal processing operations or negative films is well known.

The methods used to form positive images using direct positive silver halide photographic materials known in the past can be divided into two main types in terms of practical usefulness (if the special methods are excepted).

In methods of the first type a silver halide emulsion which has been prefogged is used and a direct positive image is obtained after development by destroying fogging nuclei in the exposed parts (latent image) using solarization or the Herschel effect, etc.

In methods of the second type an internal latent image type silver halide emulsion which has not been prefogged is used and a direct positive image is obtained on carrying out surface development either after or during a post exposure fogging treatment.

The above-mentioned internal latent image type silver halide photographic emulsions are silver halide photographic emulsions of the type which have light-sensitive nuclei primarily within the silver halide grains and with which the latent image on exposure is formed principally within the grains.

Methods of the second type referred to above generally involve higher sensitivity than methods of the first type and they are suitable for use in applications where high speed is required. This invention concerns the second type of method.

Various techniques are already known in this field of technology for increased speed. The principal techniques are disclosed, for example, in U.S. Pat. Nos. 2,592,250, 2,466,957, 2,497,875, 2,588,982, 3,317,322, 3,761,266, 3,761,276 and 3,796,577, and British Patents 1,151,363, 1,150,553 and 1,011,062, etc.

Comparatively high speed photographic materials can be obtained as direct positive type materials when these known methods are used.

Details of the formation and structure of the above-mentioned positive images are described by T. H. James in *The Theory of the Photographic Process,* Fourth Edition, chapter 7, pages 182 to 193, and in U.S. Pat. No. 3,761,276, etc.

In such materials, fogging nuclei are selectively produced on the surfaces of the silver halide grains in unexposed parts as a result of the surface sensitivity reducing action brought about by internal latent image which is produced within the silver halide grains by an initial imagewise exposure, and then a photographic image (direct positive image) is formed in unexposed parts by a normal surface development.

The known techniques for selectively forming fogging nuclei as described above include, in general, methods known as "light fogging methods" in which the whole of the photosensitive layer is subjected to a second exposure (as in British Patent 1,151,363, for example) and methods known as "chemical fogging methods" in which a nucleating agent is used. The latter methods are disclosed on pages 76 to 78 of *Research Disclosure,* Vol. 151, No. 15162 (published November, 1976).

Surface color developing process is carried out either after subjecting the internal latent image type silver halide photosensitive material to a fogging treatment or while executing such a treatment, and the material is then subjected to bleaching and fixing (or a bleach-fix) to form the direct positive color image. The material is then subjected to a normal water washing and/or stabilization process after the bleaching and fixing.

The rate of development is slow and the processing time is longer than that of a normal negative type material when a direct positive image is formed using either the light fogging or chemical fogging methods mentioned above, and so methods in which the pH and/or the temperature of the development bath are raised to shorten the processing time have been adopted in the past. However, there is the problem in that the minimum image density of the direct positive image obtained is generally increased at high pH. Further, the developing agent is liable to deteriorate as a result of aerial oxidation under conditions of high pH and the pH is liable to be reduced by the absorption of carbon dioxide from the air. This results in a marked lowering of development activity.

On the other hand, unwanted magenta or yellow absorptions are normally present in cyan dyes which are conventionally used in color photographic materials and unwanted yellow and cyan absorptions are normally present in magenta dyes, and this results in a lowering of the desired hues in color reproduction. Pyrazoloazole type magenta couplers have been developed as a means of overcoming this problem.

However, development is markedly inhibited when pyrazoloazole type couplers are used in direct positive color photographic materials, and a new problem arises in that there is a softening of the gradation in the low density parts of the image.

The use of hydroquinone derivatives (U.S. Pat. No. 3,227,552) and the use of mercapto compounds which have carboxylic acid groups and sulfonic acid groups (JP-A-60-170843) (the term "JP-A" as used herein refers to a "published unexamined Japanese patent application") are known as means of increasing the development speed for the formation of direct positive images. However, the effect achieved by using these compounds is slight and no technique has been discovered for improving the maximum image density of direct positive image and hardening the gradation of minimum density parts effectively.

Hence, the first object of the invention is to provide photographic materials which give direct positive images which have excellent color reproduction.

The second object of the invention is to provide photographic materials which give an image on development in a short period of time which has a harder gradation in the minimum density parts and which has improved whiteness.

SUMMARY OF THE INVENTION

The above-mentioned objects are achieved by means of direct positive color photosensitive materials of which the distinguishing features are that, in a direct positive color photosensitive material which has at least one internal latent image type silver halide emulsion layer which has not been prefogged on a support and colored image-forming couplers, there are included at least one type of magenta coupler which can be represented by general formula (I) indicated below and at least one type of nucleation accelerator which can be represented by general formulae (II) and/or (III) indicated below.

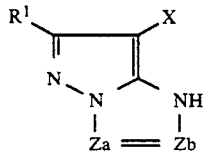

(I)

In this formula, Za and Zb represent

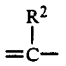

or an =N— group, $R^1$ and $R^2$ represent hydrogen atoms or substituent groups, and X represents a hydrogen atom or a group which can be eliminated by a coupling reaction with the oxidized form of a primary aromatic amine developing agent. In the case Za and Zb form a carbon-carbon double bond, the double bond may be a part of an aromatic ring, and $R^1$, $R^2$ or X may form dimers or higher polymers.

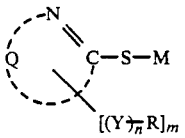

(II)

In this formula, Q represents the group of atoms required to form a 5- or 6-membered heterocyclic ring, which may be condensed with a carbon aromatic ring having from 6 to 12 carbon atoms or a heterocyclic aromatic ring, for example, a pyridine ring, a pyrimidine ring, a triazine ring, a triazole ring and an imidazole ring. Y represents a divalent linking group consisting of an atom or group or atoms selected from among a hydrogen atom, a carbon atom, a nitrogen atom, an oxygen atom, a sulfur atom, and R represents an organic group which contains at least one thioether group, amino group, ammonium group, ether group or heterocyclic group. Moreover, n represents 0 or 1 and m represents 0, 1 or 2. M represents a hydrogen atom, an alkali metal atom, an ammonium group or a group which is cleaved under alkaline conditions.

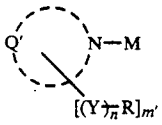

(III)

In this formula, Q′ represents the group of atoms required to form a 5- or 6-membered heterocyclic ring containing N, S, O, or Se as a hetero atom, which can form imino silver and Y, R, n and M are the same as defined for general formula (II). Moreover, m′ represents 1 or 2.

DETAILED DESCRIPTION OF THE INVENTION

The inventors have discovered that direct positive images which have surprisingly good color reproduction, satisfactory maximum densities and which exhibit a minimum density with a hard gradation can be obtained using a short development by including at least one type of magenta coupler represented by general formula (I) and at least one type of nucleation accelerator represented by general formula (II) and/or (III) in a direct positive photographic material, and the invention is based upon this discovery.

The magenta couplers represented by general formula (I) used in the invention are described in detail. below.

Preferred pyrazoloazole type magenta couplers represented by general formula (I) are those represented by general formulae (Ia) and (Ib) below.

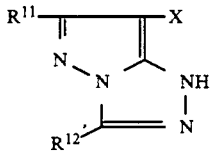

(Ia)

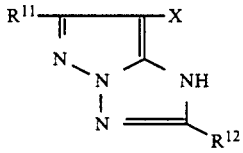

(Ib)

In general formulae (Ia) and (Ib), $R^{11}$ and $R^{12}$ may be the same or different, and each represents a hydrogen atom, a halogen atom, an alkyl group, an aryl group, a heterocyclic group, a cyano group, an alkoxy group, an aryloxy group, a heterocyclic oxy group, an acyloxy group, a carbamoyloxy group, a silyloxy group, a sulfonyloxy group, an acylamino group, an anilino group, a ureido group, an imido group, a sulfamoylamino group, a carbamoylamino group, an alkylthio group, an arylthio group, a heterocyclic thio group, an alkoxycarbonylamino group, an aryloxycarbonylamino group, a sulfonamido group, a carbamoyl group, an acyl group, a sulfamoyl group, a sulfonyl group, a sulfinyl group, an alkoxycarbonyl group or an aryloxycarbonyl group, and they preferably represent an alkyl group, an alkoxy group, an alkylthio group, an aryl group, an aryloxy group, an arylthio group, an acylamino group or an anilino group. X represents a hydrogen atom, a halogen atom, a carboxyl group or a group which undergoes coupling elimination, being a group which is bohded to the carbon atom at the coupling position via an oxygen atom, a nitrogen atom or a sulfur atom. $R^{11}$, $R^{12}$ or X may be a divalent group and bis-forms may be formed.

Further, the coupler residual groups represented by general formulae (Ia) and (Ib) may take the form of a polymeric coupler in which the groups are present in the main chain or a side chain(s) of a polymer. Those polymers which are formed from vinyl monomers which have parts which can be represented by these general formulae are especially desirable, and in such a case $R^{11}$, $R^{12}$ or X represents a vinyl group or a linking group. The linking groups represented by $R^{11}$, $R^{12}$ or X when the structure represented by general formulae (Ia) and (Ib) are contained in a vinyl monomer include groups formed by combining group selected from among alkylene groups (substituted or unsubstituted alkylene groups, for example, a methylene group, an ethylene group, a 1,10-decylene group, a $CH_2CH_2OCH_2CH_2$— group, etc.), phenylene groups (substituted or unsubstituted phenylene groups, for example, 1,4-phenylene groups, 1,3-phenylene groups, a

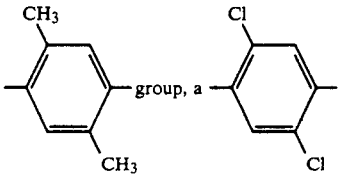

group etc.), an —NHCO— group, a —CONH— group, an —O— group, an —OCO— group, and aralkylene groups (for example,

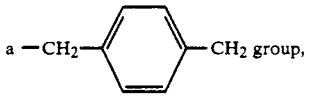

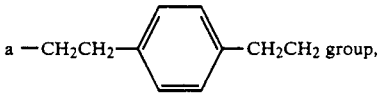

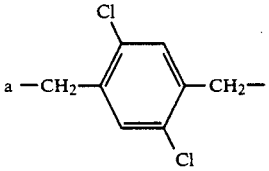

Preferred linking groups are indicated below.

—NHCO—, $—CH_2CH_2—$

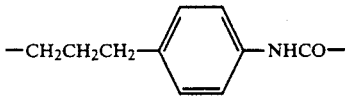

-continued

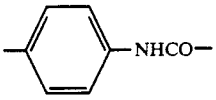

$—CH_2CH_2NHCO—$ $—CH_2CH_2—O—\underset{\underset{O}{\|}}{C}—$ $—CONH—CH_2CH_2NHCO—$ $—CH_2CH_2O—CH_2CH_2—NHCO—$

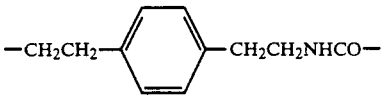

Moreover, the vinyl group may have substituent groups other than those represented by general formulae (Ia) and (Ib); preferred substituent groups are hydrogen atoms, chlorine atoms or lower alkyl groups which have from 1 to 4 carbon atoms (for example, methyl, ethyl).

Monomers which contain structures which can be represented by general formulae (Ia) and (Ib) may form copolymers with non-color-forming ethylenic monomers which do not couple with the oxidation products of primary aromatic amine developing agents.

As is well known in the field of polymeric color couplers, the non-color-forming ethylenic monomer for copolymerization with a monomeric coupler can be selected in such a way that it has a beneficial effect on the physical or chemical properties, which is to say, for example, solubility, compatibility with binding agents such as gelatin which are used in photographic colloid compositions, plasticity, heat stability, etc., of the copolymer which is formed.

The polymeric couplers used in the invention may be water-soluble or water insoluble but, among these, polymeric coupler latexes are especially desirable.

Examples of the aforementioned magenta couplers which can be used in the invention are indicated below.

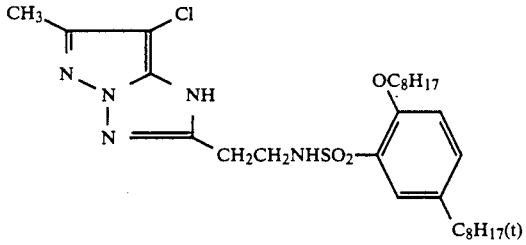

[I-1]

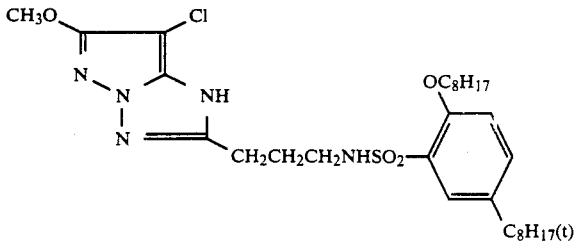

[I-2]

-continued
[I-3]
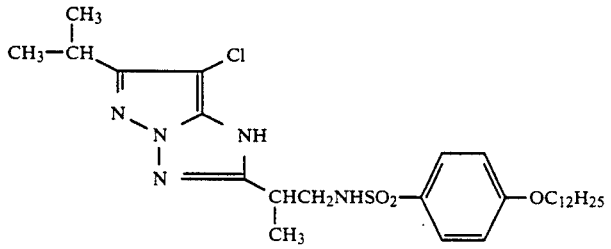
[I-4]
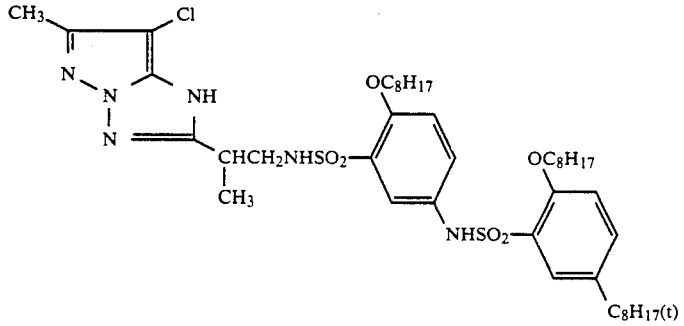
[I-5]
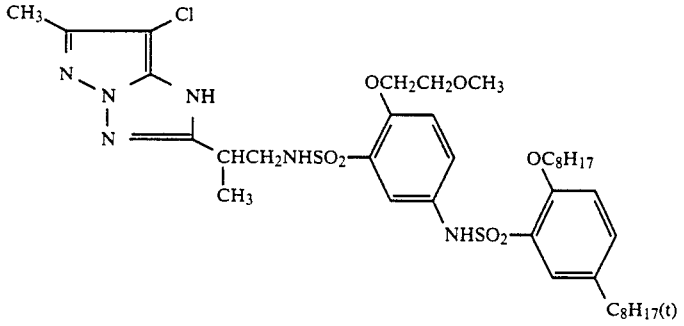
[I-6]
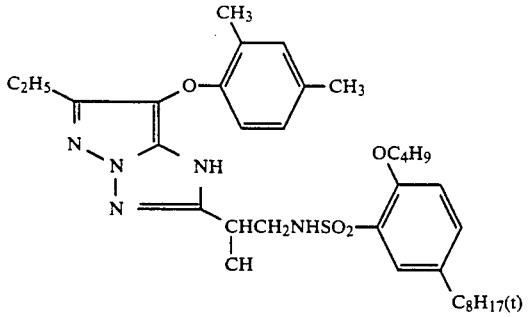
[I-7]
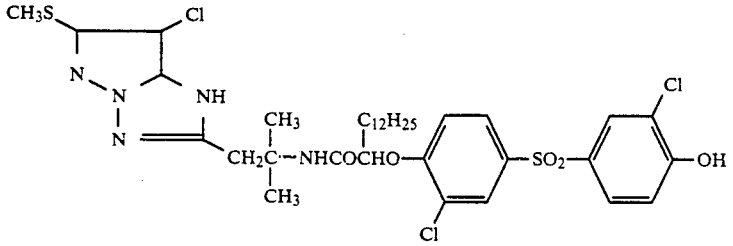

-continued
[I-8]
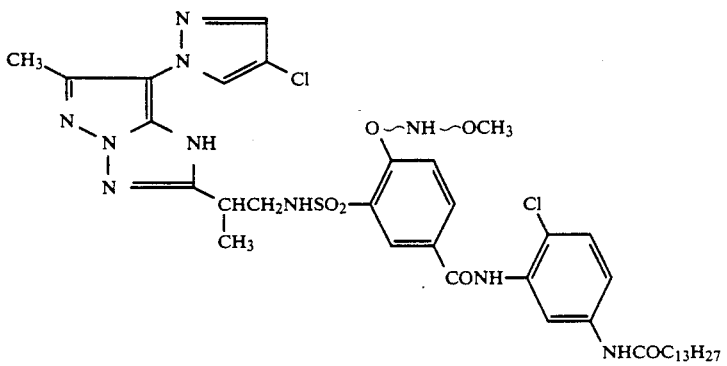
[I-9]
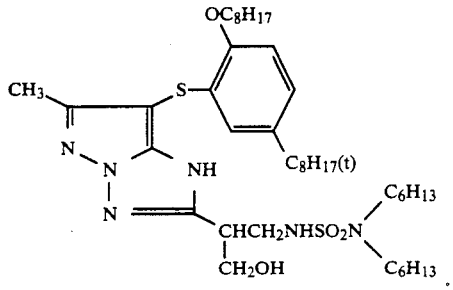
[I-10]
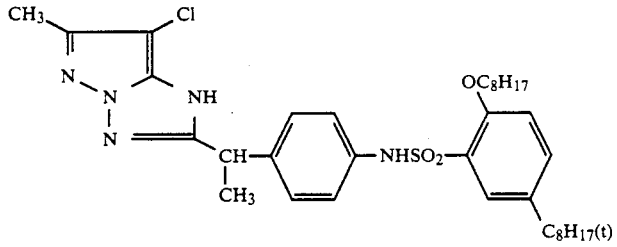
[I-11]
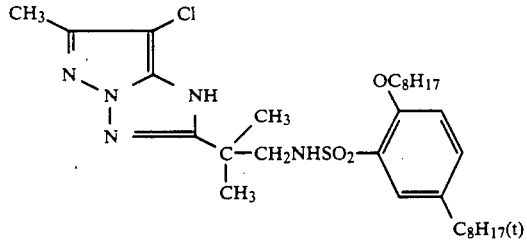
[I-12]
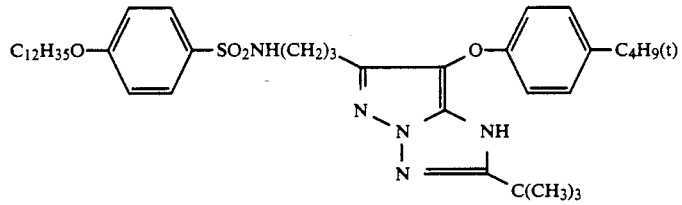
[I-13]
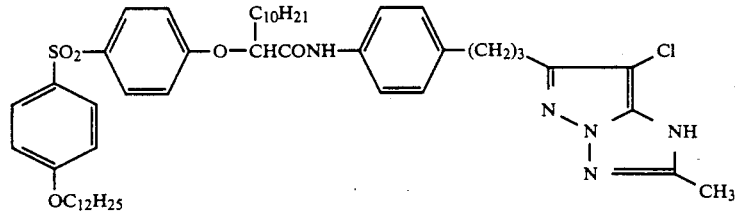

-continued
[I-14]
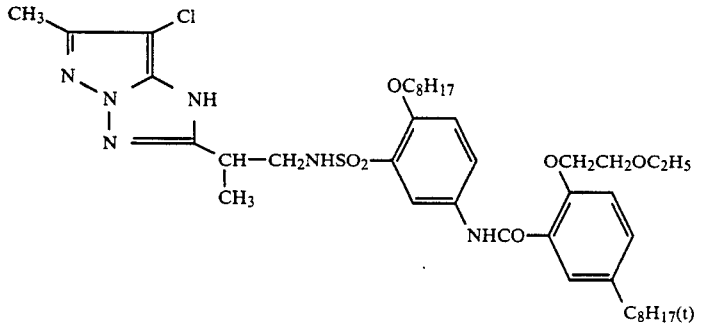
[I-15]
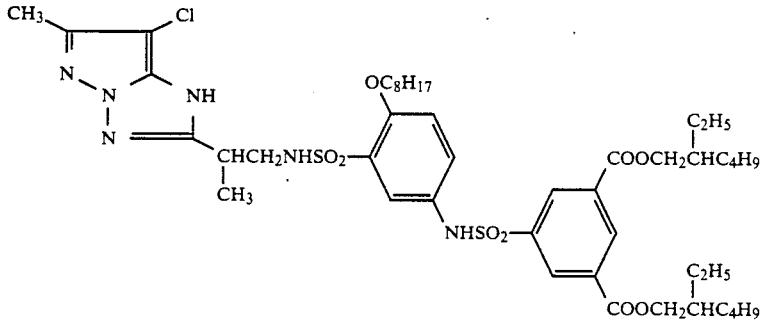
[I-16]
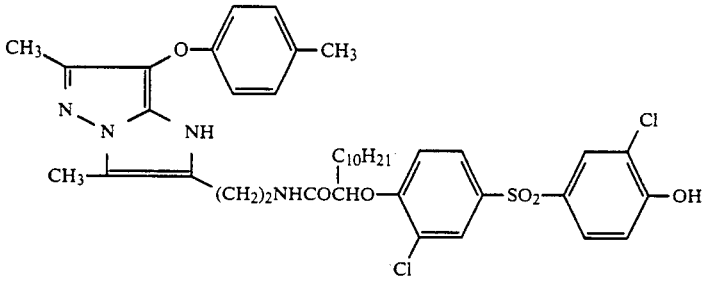
[I-17]
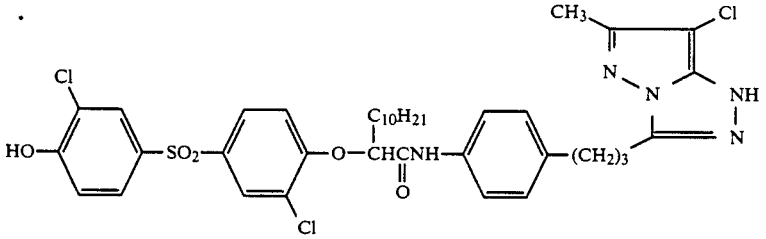
[I-18]
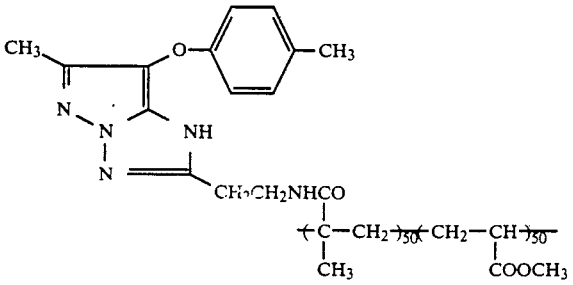

-continued
[I-19]
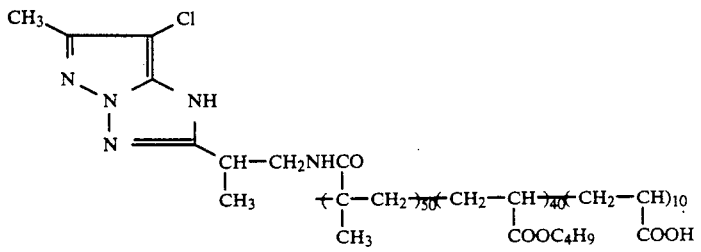
[I-20]
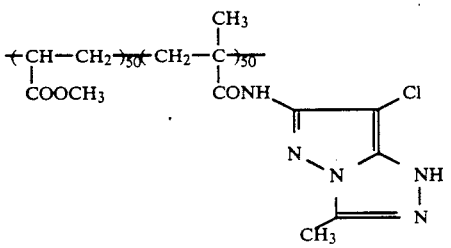
[I-21]
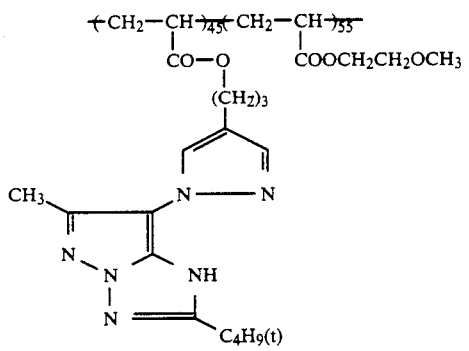
[I-22]
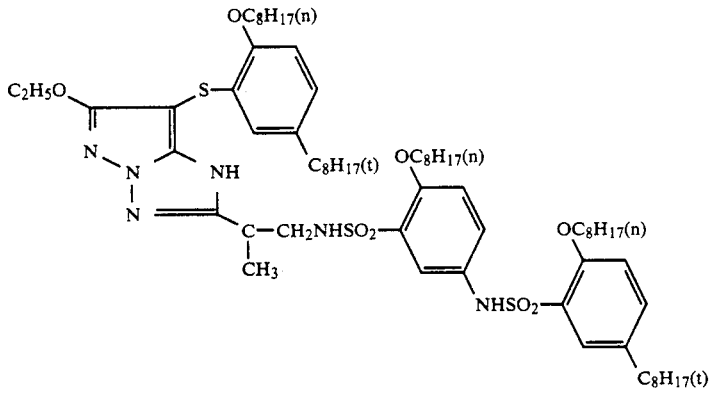
[I-23]
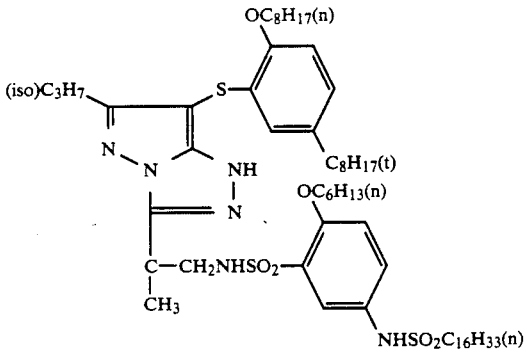

-continued
[I-24]
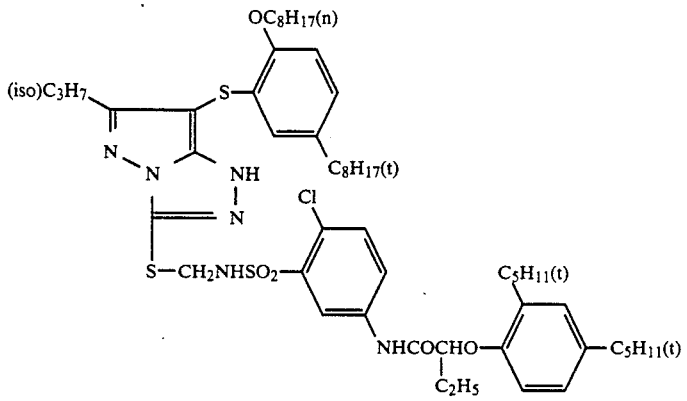
[I-25]
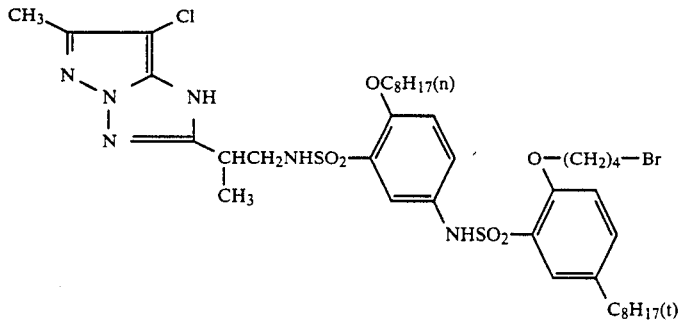
[I-26]
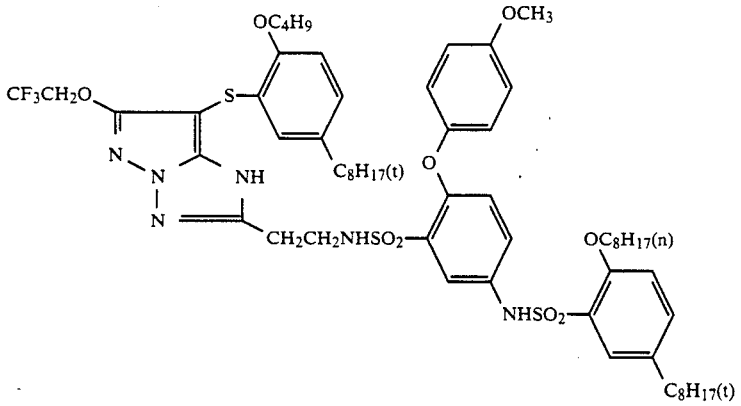
[I-27]
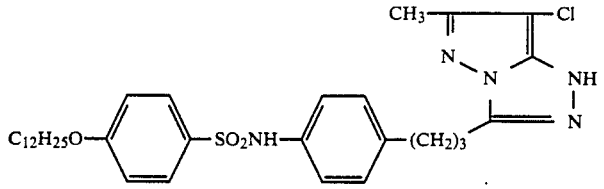
[I-28]
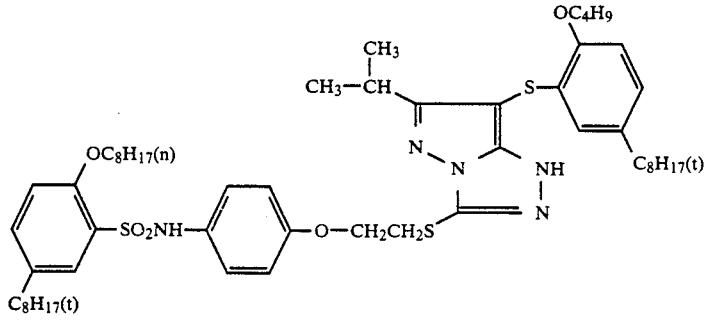

-continued
[I-29]
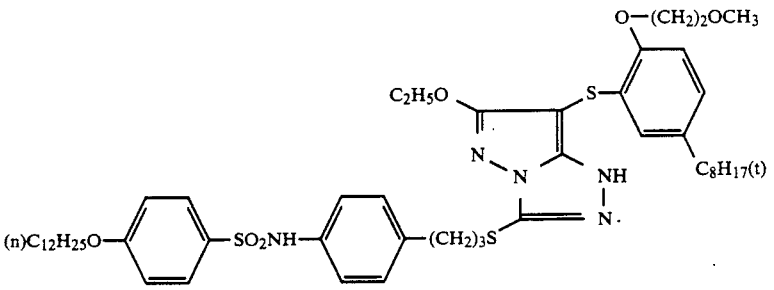
[I-30]
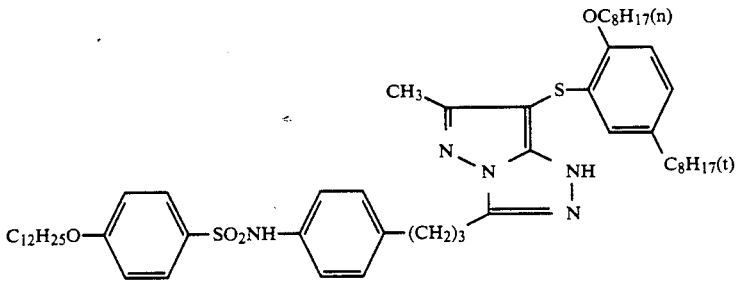
[I-31]
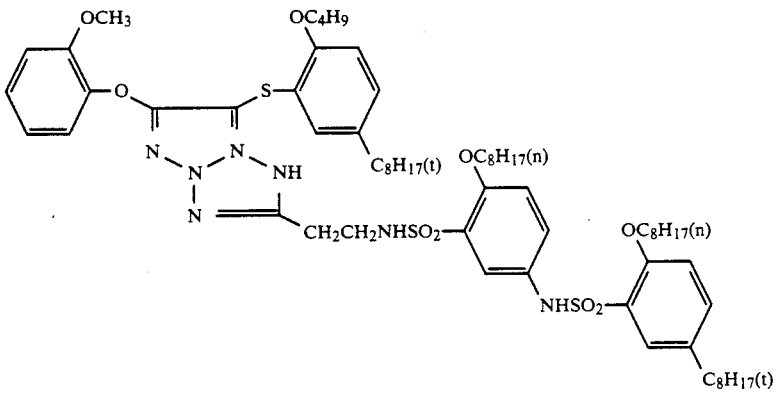
[I-32]
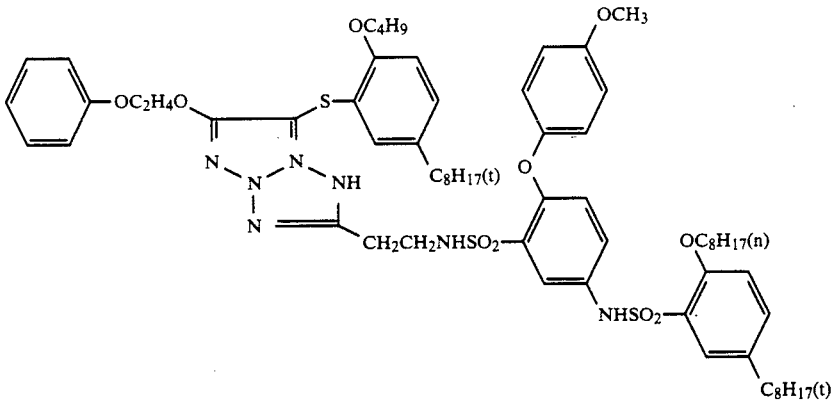
[I-33]
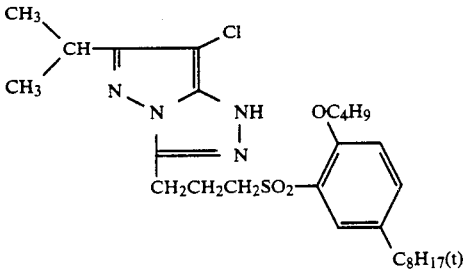

-continued

[I-34]

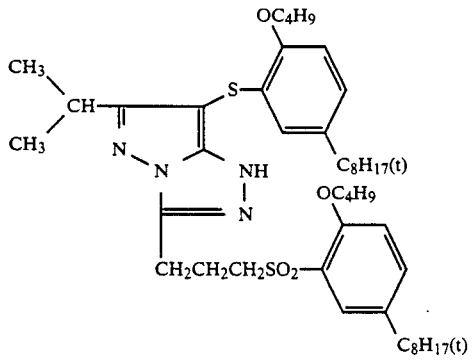

[I-35]

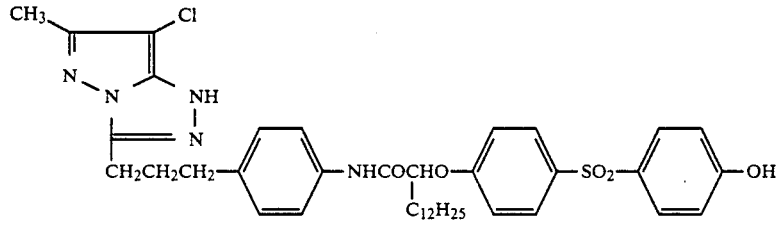

These couplers are generally added in an amount of from $1\times10^{-3}$ mol to $5\times10^{-1}$ mol, preferably from $5\times10^{-2}$ mol to $5\times10^{-1}$ mol, per mol of silver in the emulsion layer.

Two or more types of the above-mentioned couplers can be used jointly in the same layer in order to satisfy the characteristics required of the photosensitive material. Moreover, these couplers can be used jointly with other magenta couplers such as pyrazolone disclosed in *Research Disclosure,* No. 17643 (December, 1978), VII-D and ibid., No. 18717 (November, 1979).

Known methods, for example, the method disclosed in U.S. Pat. No. 2,322,027, etc., can be used to introduce the coupler into a silver halide emulsion layer. For example, the coupler can be dissolved in alkyl phthalic acid esters (dibutyl phthalate, dioctyl phthalate, etc.), phosphoric acid esters (diphenyl phosphate, triphenyl phosphate, tricresyl phosphate, dioctyl butyl phosphate) citric acid esters (for example, tributyl acetylcitrate), benzoic acid esters (for example, octyl benzoate), alkylamides (for example, diethyllaurylamide), fatty acid esters (for example, dibutoxyethyl succinate, diethyl azelate), trimesic acid esters (for example, tributyl trimesate), etc., or organic solvents of boiling point from about 30° C. to 150° C., for example, lower alkyl acetates such as ethyl acetate and butyl acetate, ethyl propionate, secondary butyl alcohol, methyl isobutyl ketone, $\beta$-ethoxyethyl acetate, methyl cellosolve acetate, etc., and then the solution can be dispersed in a hydrophilic colloid. The above-mentioned high boiling point organic solvents and low boiling point organic solvents can also be used in the form of mixtures.

The nucleation accelerators represented by general formulae (II) and (III) are described in detail below.

The term "nucleation accelerator" signifies a substance which essentially does not function as a nucleating agent (whereas a "nucleating agent" signifies a substance which functions in such a way as to form a direct positive image by acting during surface development processing of an internal latent image type silver halide emulsion which has not been prefogged) but which acts to accelerate the action of a nucleating agent, thereby increasing the maximum density of the direct positive image and/or shortening the development time required to obtain a certain direct positive image density. Combinations of two or more types of nucleation accelerators can be used.

The nucleation accelerators which can be used in the invention can be represented by general formulae (II) and/or (III).

In general formula (II), Q preferably represents the group of atoms required to form a 5- or 6-membered heterocyclic ring consisting of at least one atom selected from among carbon, nitrogen, oxygen, sulfur and selenium atoms. Furthermore, the heterocyclic ring may be condensed with a carbon aromatic ring or a heterocyclic aromatic ring.

Examples of heterocyclic rings include triazoles, imidazoles, thiadiazoles, oxadiazoles, selenadiazoles, oxazoles, thiazoles, benzoxazoles, benzothiazoles, benzimidazoles, pyrimidines, etc.

M represents a hydrogen atom, an alkali metal atom (for example, sodium, potassium), an ammonium group (for example, trimethylammonium, dimethylbenzylammonium) or a group in which M becomes a hydrogen atom or an alkali metal atom under alkaline conditions (for example, acetyl, cyanoethyl, methanesulfonylethyl).

Further, these heterocyclic rings may be substituted with nitro groups, halogen atoms (for example, chlorine, bromine), mercapto groups, cyano groups, substituted or unsubstituted alkyl groups (for example, methyl, ethyl, propyl, t-butyl, cyanoethyl), substituted or unsubstituted aryl groups (for example, phenyl, 4-methanesulfonamidophenyl, 4-methylphenyl, 3,4-dichlorophenyl, naphthyl), substituted or unsubstituted alkenyl groups (for example, allyl), substituted or unsubstituted aralkyl groups (for example, benzyl, 4-methylbenzyl, phenethyl), sulfonyl groups (for example, methanesulfonyl, ethanesulfonyl, p-toluenesulfonyl), carbamoyl groups (unsubstituted carbamoyl, methylcarbamoyl, phenylcarbamoyl), sulfamoyl groups (for example, unsubstituted sulfamoyl, methylsulfamoyl, phenylsulfamoyl), carbonamido groups (for example, acetamido, benzamido), sulfonamido groups (for example, methanesulfonamido, benzenesulfonamido, p-toluenesulfonamido), acyloxy groups (for example, acetyloxy, benzoyloxy), sulfonyloxy groups (for example, methanesulfonyloxy), ureido groups (for example, unsubstituted ureido, methylureido, ethylureido, phenylureido), thioureido (for example, unsubstituted thioureido, methylthioureido), acyl groups (for example, acetyl, benzoyl), oxycarbonyl (for example, methoxycarbonyl, phenoxycarbonyl), oxycarbonylamino groups (for example, methoxycarbonylamino, phenoxycarbonylamino, 2-ethylhexyloxycarbonylamino), carboxylic acids or salts, sulfonic acids or salts, hydroxyl groups, etc., but the absence of carboxylic acids or salts, sulfonic acids or salts, and hydroxyl groups is preferred in respect of the nucleation accelerating effect.

The heterocyclic ring represented by Q is preferably a tetrazole, triazole, imidazole, thiadiazole or oxadiazole.

Y represents a divalent linking group consisting of an atom or atoms selected from among a hydrogen atom, a carbon atom, a nitrogen atom, an oxygen atom, a sulfur atom or a combination thereof. Examples of such divalent linking groups include the following:

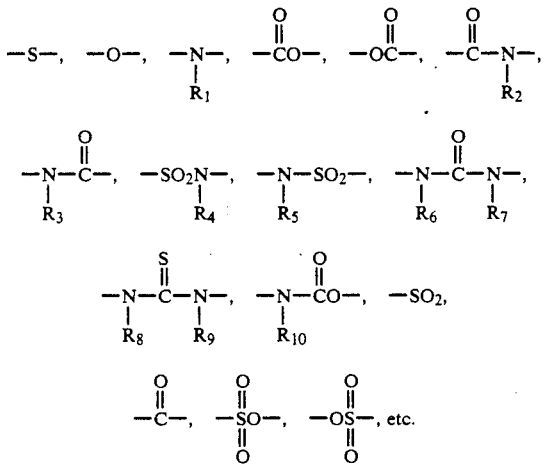

These linking groups may be bonded via a linear or branched chain alkylene group having from 1 to 12 carbon atoms, preferably from 1 to 6 carbon atoms (for example, methylene, ethylene, propylene, butylene, hexylene, 1-methylethylene), or a substituted or unsubstituted arylene group having from 6 to 12 carbon atoms, preferably from 6 to 10 carbon atoms (phenylene, naphthylene) between the above-described heterocyclic rings, in which the substituent is an alkyl group, an alkoxy group or a halogen atom.

$R_1$, $R_2$, $R_3$, $R_4$, $R_5$, $R_6$, $R_7$, $R_8$, $R_9$, and $R_{10}$ represent hydrogen atoms, substituted or unsubstituted alkyl groups (for example, methyl, ethyl, propyl, n-butyl), substituted or unsubstituted aryl groups (for example, phenyl, 2-methylphenyl), substituted or unsubstituted alkenyl groups (for example, propenyl, 1-methylvinyl), or substituted or unsubstituted aralkyl groups (for example, benzyl, phenethyl).

R represents an organic group which contains from 1 to 3 thioether groups, amino group (including a salt form, e.g., hydrochloride, hydrobromide, and p-toluenesulfonate), an ammonium group, an ether group or a heterocyclic group (including a salt form, e.g., hydrochloride, hydrobromide, and p-toluenesulfonate). These organic groups may be groups in which the afore-mentioned groups are incorporated in a group selected from among the substituted and unsubstituted alkyl groups, alkenyl groups, aralkyl groups or aryl groups, or combinations of these groups. For example, the group may be the hydrochloride of a dimethylaminoethyl group, aminoethyl group, diethylaminoethyl group, dibutylaminoethyl group or dimethylaminopropyl group; a dimethylaminoethylthioethyl group, 4-dimethylaminophenyl group, 4-dimethylaminobenzyl group, methylthioethyl group, ethylthiopropyl group, 4-methylthio-3-cyanophenyl group, methylthiomethyl group, trimethylammonioethyl group, methoxyethyl group, methoxyethoxyethoxyethyl group, methoxyethylthioethyl group, 3,4-dimethoxyphenyl group, 3-chloro-4-methoxyphenyl group, morpholinoethyl group, 1-imidazolylethyl group, morpholinoethylthioethyl group, pyrrolidinoethyl group, piperidinopropyl group, 2-pyridylmethyl group, 2-(1-imidazolyl)ethylthioethyl group, pyrazolylethyl group, triazolylethyl group, methoxyethoxyethoxyethoxycarbonylaminoethyl group, etc. Moreover, n represents 0 or 1, and m represents 0, 1 or 2, and preferably 1 or 2.

Y, R, n and M in general formula (III) have the same significance as in general formula (II), m' represents 1 or 2, and Q, represents the group of atoms required to form a 5- or 6-membered heterocyclic ring which can form imino silver. It preferably represents a group of atoms selected from among carbon, nitrogen, oxygen, sulfur and selenium required to form a 5- or 6-membered heterocyclic ring. Furthermore, this heterocyclic ring may be condensed with a carbon aromatic ring or a heterocyclic aromatic ring. The heterocyclic ring which is formed by Q' may be, for example, an imidazole, benzimidazole, benzotriazole, benzoxazole, benzothiazole, imidazole, thiazole, oxazole, triazole, tetrazole, tetraazaindene, triazaindene, diazaindene, pyrazole, indole, etc.

Nucleation accelerator represented by general formula (II) which can be represented by general formulae (IV) to (VII) indicated below are preferred.

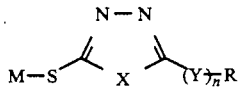

(IV)

R, M, Y and n in this formula have the same significance as in general formula (II). X represents an oxygen atom, a sulfur atom or a selenium atom, but it preferably represents a sulfur atom.

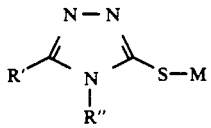

(V)

In this formula, R' represents a hydrogen atom, a halogen atom (for example, chlorine, bromine), a nitro group, a mercapto group, an unsubstituted amino group, a substituted or unsubstituted alkyl group (for example, methyl, ethyl), a substituted or unsubstituted alkenyl group (for example, propenyl, 1-methylvinyl), a substituted or unsubstituted aralkyl group (for example, benzyl, phenethyl), a substituted or unsubstituted aryl group (for example, phenyl, 2-methylphenyl), or a $-(Y)_n-R$ group.

R'' represents a hydrogen atom, an unsubstituted amino group or a $-(Y)_n-R$ group, and when R' and R″ both represent —$(Y)_2$—R groups these groups may be the same or different.

However, at least one of R′ and R″ represents a —$(Y)_2$—R group.

M, R, Y and n each have the same significance as in general formula (II).

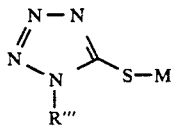

(VI)

In this formula, R‴ represents a —$(Y)_n$—R group and M, R, Y and n each have the same significance as in general formula (II).

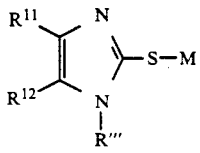

(VII)

In this formula, $R^{11}$ and $R^{12}$ represent hydrogen atoms, substituted or unsubstituted amino groups, nitro groups, or substituted or unsubstituted alkyl groups, alkenyl groups, aralkyl groups or aryl groups. Moreover, M and R‴ each have the same significance as in the aforementioned general formula (VI).

Actual compounds within general formula (II) and general formulae (IV) to (VII) of this invention are indicated below, but the compounds of the invention are not limited to these compounds.

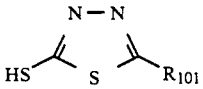

| No. | $R_{101}$ |
|---|---|
| A-1 | $-SCH_3$ |
| A-2 | $-S(CH_2)_3N(CH_3)_2.HCl$ |
| A-3 | 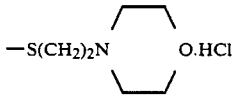 |
| A-4 | $-S(CH_2)_2OCH_3$ |
| A-5 | $-SCH_2SCH_3$ |
| A-6 | $-S(CH_2)_6N(CH_3)_2.HCl$ |
| A-7 | $-S(CH_2)_6N(C_2H_5)_2.HCl$ |
| A-8 | $-S(CH_2)_2S(CH_2)_2N(CH_3)_2.HCl$ |
| A-9 | 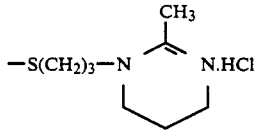 |
| A-10 | $-S(CH_2)_2\overset{\oplus}{N}(CH_3)_3.Cl^{\ominus}$ |
| A-11 | $-S(CH_2)_2NHCH_3.HCl$ |

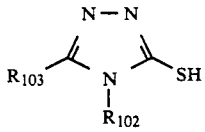

-continued

| No. | $R_{102}$ | $R_{103}$ |
|---|---|---|
| A-12 | 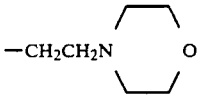 | H |
| A-13 | $-CH_3$ | H |
| A-14 | 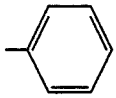 | H |
| A-15 | $-CH_2CH_2N(C_2H_5)_2$ | H |
| A-16 | $-CH_2CH_2N(CH_3)_2$ | H |
| A-17 | $-CH_3$ | $CH_3OCH_2$ |
| A-18 | 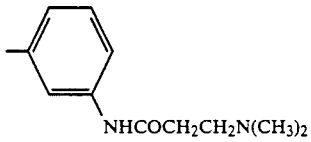 | H |
| A-19 | 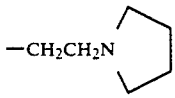 | H |
| A-20 | 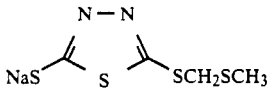 | |
| A-21 | 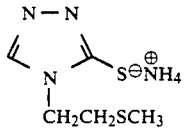 | |

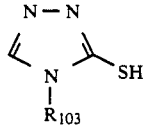

| No. | $R_{103}$ |
|---|---|
| A-22 | $-(CH_2)_2S(CH_2)_2N(CH_3)_2$ |
| A-23 | $-(CH_2)_2N(C_3H_7\text{-}n)_2$ |
| A-24 | $-(CH_2)_3N(CH_3)$ |
| A-25 | $-(CH_2)_2\overset{\oplus}{N}(CH_3)_3.Cl^{\ominus}$ |
| A-26 | 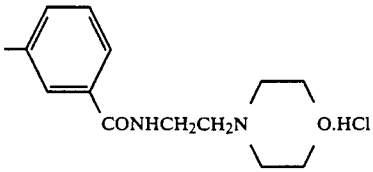 |

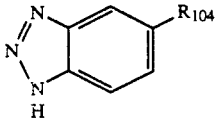

| No. | $R_{104}$ |
|---|---|
| A-27 | $-CONH(CH_2)_2N(CH_3)_2$ |
| A-28 | $-CONH(CH_2)_2SCH_3$ |

-continued

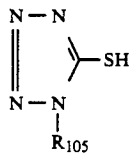

| No. | $R_{105}$ |
|---|---|
| A-29 | $-CH_3$ |
| A-30 | $-(CH_2)_2N(C_3H_7\text{-}n)_2$ |
| A-31 | $-(CH_2)_2N(C_2H_5)_2$ |
| A-32 | $-(CH_2)_2O-CH_3$ |
| A-33 | 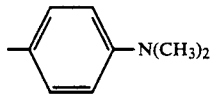 |
| A-34 | 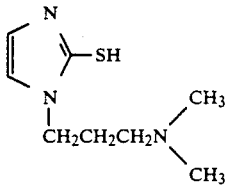 |

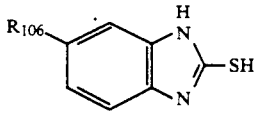

| | $R_{106}$ |
|---|---|
| A-35 | $CONHCH_2CH_2N(CH_3)_2$ |
| A-36 | 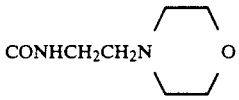 |

The nucleation accelerators used in this invention can be prepared on the basis of the methods disclosed in *Berichte der Deutschen Chemischen Gesellschaft,* 28, 77 (1895), JP-A-50-37436 and 51-3231, U.S. Pat. Nos. 3,295,976 and 3,376,310, *Berichte der Deutschen Chemischen Gesellschaft,* 22, 568 (1889), *Berichte der Deutschen Chemischen Gesellschaft,* 29, 2483 (1896), *J. Chem. Soc.,* 1932, 1806, *J. Am. Chem. Soc.,* 71, 4000 (1949), U.S. Pat. Nos. 2,585,388 and 2,541,924, *Advances in Heterocyclic Chemistry,* 9, 165 (1968), *Organic Synthesis,* IV, 569 (1963), *J. Am. Chem. Soc.,* 45, 2390 (1923), *Chemische Berichte,* 9, 465 (1876), JP-B-40-28496 (the term "JP-B" as used herein refers to an "examined Japanese patent publication"), JP-A-50-89034, U.S. Pat. Nos. 3,106,467, 3,420,670, 2,271,229, 3,137,578, 3,148,066, 3,511,663, 3,060,028, 3,271,154, 3,251,691, 3,598,599 and 3,148,066, JP-B-43-4135, U.S. Pat. Nos. 3,615,616, 3,420,664, 3,071,465, 2,444,605, 2,444,606, 2,444,607 and 2,935,404, etc.

The nucleation accelerators are preferably present in the photosensitive materials and the amount present is preferably from $10^{-6}$ to $10^{-2}$ mol, more preferably from $10^{-5}$ to $10^{-2}$ mol, per mol of the silver halide. These nucleation accelerators may be used in combination of two or more kinds thereof.

The internal latent image type silver halide emulsion which has not been prefogged which is used in the invention is an emulsion in which the surface of the silver halide grains has not been prefogged and which contains silver halide in which the latent image is formed principally within the grains, and in practical terms it is a silver halide emulsion which, when coated at a fixed rate (0.5 to 3 g per square meter) onto a support, exposed for a fixed time of from 0.01 to 10 seconds and developed for 5 minutes at 18° C. in development bath A indicated below (an internal type development bath) is such that the maximum density measured using a conventional photographic densitometric method is at least 5 times more dense, and preferably at least 10 times more dense, than the density obtained when the emulsion is coated at the same rate as described above, exposed in the same way as described above and developed for 6 minutes at 20° C. in development bath B indicated below (a surface type development bath).

| Internal Development Bath A | |
|---|---|
| Metol | 2 g |
| Sodium Sulfite (anhydrous) | 90 g |
| Hydroquinone | 8 g |
| Sodium Carbonate (monohydrate) | 52.5 g |
| KBr | 5 g |
| KI | 0.5 g |
| Water to make | 1 liter |
| **Surface Devleopment Bath B** | |
| Metol | 2.5 g |
| L-Ascorbis Acid | 10 g |
| $NaBO_2 \cdot 4H_2O$ | 35 g |
| KBr | 1 g |
| Water to make | 1 liter |

Actual examples of internal latent image type emulsions include the conversion type silver halide emulsions disclosed in U.S. Pat. No. 2,592,250 and the core/shell type silver halide emulsions disclosed in U.S. Pat. Nos. 3,761,276, 3,850,637, 3,923,513, 4,035,185, 4,395,478 and 4,504,570, JP-A-52-156614, 55-127549, 53-60222, 56-22681, 59-208540, 60-107641 and 61-3137, JP-A-62-215272, and in the patents disclosed in *Research Disclosure,* No. 23510, page 236 (published November, 1983).

The silver halide grains used in the invention may have a regular crystalline form such as a cubic, octahedral, dodecahedral or tetradecahedral form, or an irregular crystalline form such as a spherical form, and grains which have a tabular form in which the value of the ratio length/thickness is at least 5 may be used. Furthermore, grains which have a composite form made up of such forms, and emulsions which consist of mixtures of these forms, can also be used.

The composition of the silver halide can be silver chloride, silver bromide or a mixed silver halide, and the use of a silver chloro(iodo)bromide, silver (iodo)chloride or silver (iodo)bromide in which the silver iodide content does not exceed 3 mol % is preferred.

The average grain size of the silver halide grains is preferably not more than 2 μm, but more than 0.1 μm, and grains of a size not exceeding 1 μm but not less than 0.15 μm are especially desirable. The grain size distribution may be narrow or wide, but the use of a "monodisperse" silver halide emulsion which has a narrow grain size distribution such that at least 90% of all the grains in terms of the number of grains or weight are within ±40%, and preferably within ±20%, of the average grain size is preferred in this invention in order to improve granularity and sharpness. Furthermore, it is possible to mix two or more monodisperse silver halide emulsions which have different grain sizes or a plurality of grains which have different sensitivities at the same size, or to coat separate layers of such emulsions as a laminate in emulsion layers which have essentially the same color sensitivity in order to achieve the gradation required of the photosensitive material. Moreover, it is possible to use mixtures or laminates of two or more polydisperse silver halide emulsions or combinations of monodisperse and polydisperse emulsions.

The silver halide emulsion used in the invention can be chemically sensitized by the application, either individually or conjointly, of sulfur or selenium sensitizers, reducing sensitizers, precious metal sensitizers, etc., to the interior or the surface of the grains. Detailed examples may be found, for example, in the patents mentioned on page 23 of *Research Disclosure,* No. 17643-III (published December, 1978), etc.

The photographic emulsions used in the invention are spectrally sensitized by means of photographic sensitizing dyes in a conventional manner. Especially useful dyes are those known as cyanine dyes, merocyanine dyes and complex merocyanine dyes, and these dyes can be used individually or jointly. Furthermore, the abovementioned dyes and strong color sensitizers may be used jointly. Detailed examples may be found in the patents indicated on pages 23 and 24 of *Research Disclosure,* No. 17643-IV (published December, 1978).

Antifogging agents or stabilizers can be included in the photographic emulsions used in the invention in order to prevent the occurrence of fogging during the manufacture, storage or photographic processing of the photosensitive material or to stabilize photographic performance. Examples are given in *Research Disclosure,* No. 17643-VI (published December, 1978) and in *Stabilization of Photographic Silver Halide Emulsion,* by E. J. Birr, (Focal Press) published in 1974.

Various cyan and yellow color couplers can be used together with the pyrazoloazole type magenta couplers of general formula (I) in the photosensitive materials for forming direct positive color images. Moreover, magenta couplers other than the pyrazoloazole based magenta couplers used in the invention can be used conjointly.

Useful color couplers are compounds which undergo a coupling reaction with the oxidized form of a primary aromatic amine-based color developing agent and produce or release a dye which is essentially resistant to diffusion, and they are themselves compounds which are essentially resistant to diffusion. Typical examples of useful color couplers include naphthol or phenol-based compounds and closed chain or heterocyclic ketomethylene compounds.

Examples of cyan, magenta and yellow couplers which can be used in the invention are disclosed in the patents cited in *Research Disclosure,* No. 18717 (published November, 1979) and in section VII-D, of *Research Disclosure,* No. 17643 (published December, 1987).

Among these compounds, the oxygen atom elimination type and nitrogen atom elimination type yellow 2-equivalent couplers are typical of the yellow couplers which can be used in this invention. The α-pivaloylacetanilide-based couplers are superior in terms of fastness, especially light fastness, of the resulting colored dye, while the α-benzoylacetanilide-based couplers are preferred since they provide high color densities.

Phenol-based cyan couplers which have an alkyl group consisting of an ethyl or larger group in the meta position of the phenol ring disclosed in U.S. Pat. No. 3,772,002 are preferably used as the cyan couplers in this invention, and the use of 2,5-diacylaminosubstituted phenol-based couplers is also desirable in view of the fastness of the colored image.

The standard amount of color coupler used is within the range from 0.001 to 1 mol per mol of photosensitive silver halide, and the amount used is preferably within the range from 0.01 to 0.5 mol for the yellow coupler, within the range from 0.03 to 0.5 mol for the magenta coupler and within the range from 0.002 to 0.5 mol for the cyan coupler.

Photosensitive materials made using the invention may contain hydroquinone derivatives, aminophenol derivatives, amines, gallic acid derivatives, catechol derivatives, ascorbic acid derivatives, colorless couplers, sulfonamidophenol derivatives, etc., as anti-color-fogging agents or anti-color-mixing agents.

Various anti-color-fading agents can be used in the photosensitive materials of this invention. Typical examples of organic anti-color-fading agents include hydroquinones, 6-hydroxychromans, 5-hydroxycoumarans, spirochromans, p-alkoxyphenols, hindered phenols centered on bisphenols, gallic acid derivatives, methylenedioxybenzenes, aminophenols, hindered amines, and ether or ester derivatives in which the phenolic hydroxyl groups of these compounds have been silylated or alkylated. Furthermore, metal complexes as typified by the (bissalicylaldoxymato)nickel complexes and (bis-N,N-dialkyldithiocarbamato)nickel complexes can also be used.

Compounds which have a hindered amine structure and a hindered phenol structure within the same molecule, such as those disclosed in U.S. Pat. No. 4,268,593, have a good effect in preventing the deterioration of yellow dye image due to heat, moisture and light. Furthermore, the spiroindanes disclosed in JP-A-56-159644 and the chromans substituted with hydroquinone diethers or monoethers disclosed in JP-A-55-89835 have a desirable effect in preventing deterioration, and especially deterioration due to light, of a magenta dye image. The intended purpose can be achieved by adding these compounds to the photosensitive layers in a co-emulsified form with the couplers at a rate normally of from 5 to 100 wt % with respect to the corresponding color coupler. The introduction of ultraviolet absorbers into layers on both sides adjacent to the cyan color-forming layer is effective for preventing deterioration by heat, and especially by light, of the cyan dye image. Moreover, ultraviolet absorbers can also be added to hydrophilic colloid layers such as the protective layers.

Gelatin is convenient for use as the binding agent or protective colloid which is used in the emulsion layers and intermediate layers of a photosensitive material of this invention, but other types of hydrophilic colloid can be used for this purpose.

Dyes for the prevention of irradiation and halation, antistatic agents, and slip-improving agents, etc., can be added to photosensitive materials of this invention.

Typical examples of these additives are disclosed in *Research Disclosure,* No. 17643 (published December, 1978) and in *Research Disclosure,* No. 18716 (published November, 1979).

The invention can also be applied to multilayer multicolor photographic materials which have at least two layers of different color sensitivity on a support. Multilayer natural color photographic materials normally have at least one red-sensitive emulsion layer, at least one green-sensitive emulsion layer and at least one blue-sensitive emulsion layer on a support. The order of these layers can be arranged arbitrarily as required. The preferred sequence for the arrangement of the layers is, starting from the support side, either red-sensitive—green-sensitive—blue-sensitive, or green-sensitive—red-sensitive—blue-sensitive. Further, each of the aforementioned emulsion layers may consist of two or more emulsion layers which have different sensitivities and, furthermore, nonsensitive layers may be present between two or more emulsion layers which have the same color sensitivity. Cyan-forming couplers are normally included in the red-sensitive emulsion layer, magenta-forming couplers are normally included in the green-sensitive layers and yellow-forming couplers are normally included in the blue-sensitive layer, but different combinations can be used, depending upon the particular case.

Photosensitive materials of this invention preferably have suitably established auxiliary layers such as protective layers, intermediate layers, filter layers, antihalation layers, backing layers, white reflecting layers, etc., as well as the silver halide emulsion layers.

The photographic emulsion layers and other layers in photographic materials of this invention are coated onto a flexible support, such as plastic film, paper, cloth etc., or a rigid support, such as glass, porcelain, metal, etc., of the type normally used for photographic materials. Materials which can be used as flexible supports include films made from semi-synthetic and synthetic polymers such as cellulose nitrate, cellulose acetate, cellulose acetate butyrate, polystyrene, poly(vinyl chloride), polyethylene terephthalate, polycarbonate, etc., and paper, etc., which has been coated on laminated with a baryta layer or an α-olefin polymer (for example, polyethylene, polypropylene, ethylene/butene copolymer), etc. The support may also be colored with dyes or pigments. It may also be colored black for light-shielding purposes. The surface of the support is generally undercoated to improve the adhesion of the photographic emulsion layers, etc. The surface of the support may also be subjected to a glow discharge treatment, corona discharge treatment, ultraviolet irradiation treatment, flame treatment, etc., before or after the undercoating treatment.

The silver halide photographic emulsion layers and other hydrophilic colloid layers can be coated using a variety of known coating methods, for example, dip coating, roll coating, curtain coating, extrusion coating, etc.

The invention can be applied to various color photosensitive materials. For example, it can be applied typically to color reversal films for slide or television purposes and to reversal papers, etc. Furthermore, it can also be suitably applied to a color hard copy, etc., for preserving CRT images and for full color copying machines. The invention can also be applied to monochrome photosensitive materials in which tricolor coupler mixtures are used, as disclosed in *Research Disclosure,* No. 17123 (published July, 1978), etc.

The photosensitive materials of this invention are developed, after imagewise exposure, in a surface development bath which contains a primary aromatic amine-based color developing agent either after or during the performance of a fogging treatment using light or a nucleating agent, and then they are subjected to bleaching and fixing to form a direct positive colored image.

The fogging treatment in this invention may be carried out using either the aforementioned "light fogging method" in which a second exposure is applied to the whole surface of the photosensitive layer, or the aforementioned "chemical fogging method" in which the development process is carried out in the presence of a nucleating agent. The development process may also be carried out in the presence of a nucleating agent and fogging light. Furthermore, a photosensitive material which contains a nucleating agent may be subjected to a fogging exposure.

The whole surface exposure, which is to say the fogging exposure, in the light fogging method of this invention is carried out after imagewise exposure before the development process and/or during the development process. The imagewise exposed photosensitive material can be exposed while immersed in the development bath or in a development prebath such as water, an aqueous alkaline solution, or an aqueous acidic solution, which may contain a salt, or on removal from these baths without drying, but the exposure is preferably made in the development bath.

A light source within the photosensitive wavelength of the photosensitive material may be used for the fogging exposure and, in general, fluorescent lamps, tungsten lamps, xenon lamps, sunlight, etc., can all be used for this purpose. Useful methods have been disclosed, for example, in British Patent 1,151,363, JP-B-45-12710, 45-12709 and 58-6936, and in JP-A-48-9727, 56-137350, 57-129438, 58-62652, 58-60739, 58-70223 (corresponding to U.S. Pat. No. 4,440,851) and 58-120248 (corresponding to European Patent 89101A2), etc.

With photosensitive materials which are sensitive to light in all wavelength regions, for example, color photosensitive materials, light sources which have a high color rendition (approaching as near as possible to white) such as those disclosed in JP-A-56-137350 and 58-70223 are best.

The brightness of the light is from 0.01 to 2,000 lux, preferably from 0.05 to 30 lux, and most desirably from 0.05 to 5 lux. Sensitizing light of lower intensity is preferred with photosensitive materials in which higher speed emulsions are used. The illuminance may be adjusted by changing the luminous intensity of the light source, by reducing the level of light with various filters, or by changing the distance between the photosensitive material and the light source or the angle between the photosensitive material and the light source. The exposure time can be shortened by using a lower illuminance light at the initial stage of the exposure and then a higher illuminance light (1.5 to 10,000 times higher than the lower illuminance light).

The irradiation with light is best carried out after the photosensitive material has been immersed in the liquid of the development bath or prebath and the liquid has permeated into the emulsion layer of the photosensitive material to such an extent that the swelling of the emulsion layer becomes one-half of the saturated swelling. The time from immersion in the liquid prior to the light fogging exposure is generally from 2 seconds to 2 minutes, preferably from 5 seconds to 1 minute, and most desirably from 10 seconds to 30 seconds.

The exposure time for fogging is generally from 0.01 second to 2 minutes, preferably from 0.1 second to 1 minute, and most desirably from 1 second to 40 seconds.

The compounds disclosed in JP-A-63-106656, pages 19 to 28, are nucleating agents which can be used in this invention, and the use of the compounds which can be represented by general formulae (N-1) and (N-2) in the same specification is especially desirable.

Examples of compounds which can be represented by general formula (N-1) are indicated below.

(N-I- 1): 5-Ethoxy-2-methyl-1-propargylquinolinium bromide (N-I- 2): 2,4-Dimethyl-1-propargylquinolinium bromide (N-I- 3): 2-Methyl-1-{3-[2-(4-methylphenyl)hydrazono]butyl}quinolinium iodide (N-I- 4): 3,4-Dimethyldihydropyrido[2,1-b]benzothiazolium bromide (N-I- 5): 6-Ethoxythiocarbonylamino-2-ethyl-1-propargylquinolinium trifluoromethanesulfonate (N-I- 6): 2-Methyl-6-(3-phenylthioureido)-1-propargylquinolinium bromide (N-I- 7): 6-(5-Benzotriazolecarboxamido)-2-methyl-1-propargylquinolinium trifluoromethanesulfonate (N-I- 8): 6-[3-(2-mercaptoethyl)ureido]-2-methyl-1-propargylquinolinium trifluoromethanesulfonate (N-I- 9): 6-{[3-(5-mercapto-1,3,4-thiadiazol-2-ylthio)-propyl]ureido}-2-methyl-1-propargylquinolinium trifluoromethanesulfonate (N-I-10): 6-(5-Mercaptotetrazol-1-yl)-2-methyl-1-propargylquinolinium iodide (N-I-11): 1-Propargyl-2-(1-propenyl)quinolinium trifluoromethanesulfonate (N-I-12): 6-Ethoxythiocarbonylamino-2-(2-methyl-1-propenyl)-1-propargylquinolinium trifluoromethanesulfonate (N-I-13): 10-Propargyl-1,2,3,4-tetrahydroacridinium trifluoromethanesulfonate (N-I-14): 7-Ethoxythiocarbonylamino-10-propargyl-1,2,3,4-tetrahydroacridinium trifluoromethanesulfonate (N-I-15): 6-Ethoxythiocarbonylamino-1-propargyl-2,3-pentamethylenequinolinium trifluoromethanesulfonate (N-I-16): 7-[3-(5-Mercaptotetrazol-1-yl-)benzamido]-10-propargyl-1,2,3,4-tetrahydroacridinium perchlorate (N-I-17): 6-[3-( -Mercaptotetrazol-1-yl)benzamido]-1-propargyl-2,3-pentamethylenequinolinium bromide (N-I-18): 7-(5-Mercaptotetrazol-1-yl)-9-methyl-10-propargyl-1,2,3,4-tetrahydroacridinium bromide (N-I-19): 7-[3-(N-[2-(5-Mercapto-1,3,4-thiadiazol-2-yl)thioethyl]carbamoyl}propanamido]-10-propargyl-1,2,3,4-tetrahydroacridinium tetrafluoroborate (N-I-20): 6-(5-Mercaptotetrazol-1-yl)-4-methyl-1-propargyl-2,3-pentamethylenequinolinium bromide (N-I-21): 7-Ethoxythiocarbonylamido-10-propargyl-1,2-dihydroacridinium trifluoromethanesulfonate (N-I-22): 7-(5-Mercaptotetrazol-1-yl)-9-methyl-10-propargyl-1,2-dihydroacridinium hexafluorophosphate (N-I-12): 7-[3-(5-Mercaptotetrazol-1-yl)benzamido]-10-propargyl-1,2-dihydroacridinium bromide Examples of compounds which can be represented by general formula (N-II) are indicated below.

(N-II- 1): 1-Formyl-2-(4-[3-(2-methoxyphenyl)ureido]-phenyl}hydrazine (N-II- 2): 1-Formyl-2-(4-[3-{3-[3-(2,4-di-tert-pentylphenoxy)propyl]ureido}phenylsulfonylamino]-phenyl}hydrazine (N-II- 3): 1-Formyl-2-{4-[3-(5-mercaptotetrazol-1-yl)benzamido]phenyl}hydrazine (N-II- 4): 1-Formyl-2-[4-{3-[3-(5-mercaptotetrazol-1-yl)phenyl]ureido}phenyl]hydrazine (N-II- 5): 1-Formyl-2-[4-{3-[N-(5-mercapto-4-methyl-1,2,4-triazol-3-yl)carbamoyl]propanamido}phenyl]-hydrazine (N-II- 6): 1-Formyl-2-{4-[3-{N-[4-(3-mercapto-1,2,4-triazol-4-yl)phenyl]carbamoyl}propanamido]phenyl} hydrazine (N-II- 7): 1-Formyl-2-[4-{3-[N-(5-mercapto-1,3,4-thiadiazol-2-yl)carbamoyl]propanamido}phenyl]hydrazine (N-II- 8): 2-[4-(Benzotriazol-5-carboxamido)phenyl]-1-formylhydrazine (N-II- 9): 2-[4-(3-[N-(Benzotriazol-5-carboxamido)carbamoyl]propanamido}phenyl]-1-formylhydrazine (N-II-10): 1-Formyl-2-{4-[1-(N-phenylcarbamoyl)thiosemicarbamido]phenyl}hydrazine (N-II-11): 1-Formyl-2-{4-[3-(3-phenylthioureido)benzamido]phenyl}hydrazine (N-II-12): 1-Formyl-2-[4-(3-hexylureido)phenyl]hydrazine (N-II-13): 1-Formyl-2-{4-[3-(5-mercaptotetrazol-1-yl)benzenesulfonamido]phenyl}hydrazine (N-II-14): 1-Formyl-2-{4-[3-{3-[3-(5-mercaptotetrazol-1-yl)phenyl]ureido}benzenesulfonamido]phenyl}hydrazine The color development baths used for the development processing of photosensitive materials of this invention are preferably alkaline aqueous solutions which contain primary aromatic amine-based color developing agents. Aminophenol-based compounds can also be used as color developing agents, but the use of p-phenylenediamine-based compounds is preferred, and 3-methyl-4-amino-N,N-diethylaniline, 3-methyl-4-amino-N-ethyl-N-8-hydroxyethylaniline, 3-methyl-4-amino-N-ethyl-N-$\beta$-methanesulfonamidoethylaniline, 3-methyl-4-amino-N-ethyl-N-$\beta$-methoxyethylaniline and the hydrochloride, sulfate and p-toluenesulfonate salts thereof are typical examples of these color developing agents. Two or more of these compounds can be used jointly, depending on the intended purpose.

Color development baths generally contain pH buffers, such as carbonates, borates or phosphates of alkali metals, and development inhibitors or antifogging agents such as bromides, iodides, benzimidazoles, benzothiazoles or mercapto compounds. Further, they may also contain various preservatives, such as hydroxylamine, diethylhydroxylamine, sulfites, hydrazines, phenylsemicarbazides, triethanolamine, catechol sulfonate and triethylenediamine(1,4-diazabicyclo[2,2,2]octanes, organic solvents such as ethylene glycol and diethylene glycol, development accelerators such as benzyl alcohol, poly(ethylene glycol), quaternary ammonium salts and amines, dye-forming couplers, competitive couplers, fogging agents such as sodium borohydride, auxiliary developing agents such as 1-phenyl-3-pyrazolidone, viscosity imparting agents, various chelating agents typified by aminopolycarboxylic acids, aminopolyphosphonic acids, alkylphosphonic acids and phosphonocarboxylic acids, of which typical examples include ethylenediaminetetraacetic acid, nitrilotriacetic acid, diethylenetriaminepentaacetic acid, cyclohexanediaminetetraacetic acid, hydroxyethyliminodiacetic acid, 1-hydroxyethylidene-1,1-diphosphonic acid, nitrilo-N,N,N-trimethylenephosphonic acid, ethylenediamine-N,N,N',N'-tetramethylenephosphonic acid, ethylenedianinedi(o-hydroxyphenylacetic acid), and salts of these compounds, as required.

The pH of these color developers is generally within the range from 9 to 12. Furthermore, the replenishment rate of the development bath depends on the color photographic material which is being processed, but it is generally less than 1 liter per square meter of photosensitive material and it is possible, by reducing the bromide ion concentration in the replenisher, to use a replenishment rate of not more than 300 ml per square meter of photosensitive material. The prevention of any loss of liquid by evaporation, and aerial oxidation, by minimizing the contact area with the air in the processing tank is desirable when the replenishment rate is low. Furthermore, the replenishment rate can be reduced by using a means of suppressing the accumulation of bromide ion in the developer.

The photographic emulsion layers are subjected to a conventional bleaching after color development. bleaching may be carried out at the same time as fixing (in a bleach-fix process) or it may be carried out as a separate process. Moreover, a bleach-fix can be carried out after a bleaching in order to speed up processing. Moreover, processing can be carried out in two connected bleach-fix baths, fixing can be carried out before carrying out a bleach-fix or a bleaching can be carried out after a bleach-fix, according to the intended purpose of the processing.

Compounds of a polyvalent metal such as iron(III), cobalt(III), chromium (VI), copper(II), etc., peracids, quinones, nitro compounds, etc., can be used as bleaching agents. Typical bleaching agents include ferricyanides; dichromates; organic complex salts of iron(III) or cobalt(III), for example, complex salts with aminopolycarboxylic acids such as ethylenediaminetetraacetic acid, diethylenetriaminepentaacetic acid, cyclohexanediaminetetraacetic acid, methyliminodiacetic acid, 1,3-diaminopropanetetraacetic acid, glycol ether diaminetetraacetic acid, etc., or citric acid, tartaric acid, malic acid, etc.; persulfates; bromates; permanganates and nitrobenzenes, etc.

Of these materials the use of the aminopolycarboxylic acid iron(III) complex salts, principally ethylenediaminetetraacetic acid iron(III) complex salts, and persulfates, is preferred from the points of view of both rapid processing and the prevention of environmental pollution. Moreover, the aminopolycarboxylic acid iron(III) complex salts are especially useful in both bleach baths and bleach-fix baths. The pH value of bleach or bleach-fix baths in which these aminopolycarboxylic acid iron(III) complex salts are used is normally from 5.5 to 8, but a lower pH value can be used in order to speed-up processing.

Bleach accelerators can be used, as required, in the bleach baths, bleach-fix baths, or bleach or bleach-fix prebaths. Examples of useful bleach accelerators are disclosed in the following specifications: compounds which have a mercapto group or a disulfide bond as disclosed in U.S. Pat. No. 3,893,858, West German Patent 1,290,812, JP-A-53-95630 and in *Research Disclosure,* No. 17129 (July, 1978), etc.; thiazolidine derivatives as disclosed in JP-A-50-140129; thiourea derivatives as disclosed in U.S. Pat. No. 3,706,561; iodides as disclosed in JP-A-58-16235; polyoxyethylene compounds as disclosed in West German Patent 2,748,430; polyamine compounds as disclosed in JP-B-45-8836; bromide ion, etc. Among these compounds, those which have a mercapto group or a disulfide group are preferred in view of their high accelerating effect, and the use of the compounds as disclosed in U.S. Pat. No. 3,893,858, West German Patent 1,290,812 and JP-A-53-95630 is especially desirable. Moreover, the use of the compounds disclosed in U.S. Pat. No. 4,552,834 is also desirable. These bleach accelerators may be added to the sensitive material. These bleach accelerators are especially effective when bleach-fixing color photosensitive materials for photographic purposes.

Thiosulfates, thiocyanates, thioether-based compounds, thioureas and large quantities of iodides, etc., can be used as fixing agents, but thiosulfates are generally used for this purpose, and ammonium thiosulfate can be used in a wide range of applications. Sulfites or bisulfites, or carbonyl-bisulfite addition compounds, are the preferred preservatives for bleach-fix baths.

In this invention, a water washing bath is a bath which is intended to wash out the processing bath components which are attached to, or absorbed in, the color photosensitive material and to wash out the structural components of the color photosensitive material which should be removed in order to ensure desired photographic performance after processing and the stability of the image.

Furthermore, a stabilizing bath signifies a bath which has an image stabilizing function which is not obtained with a water washing bath in addition to having the functions of a water washing bath as described above, and examples of such baths include those which contain formalin. The amount of carry-over from the previous bath signifies the volume of liquid from the previous bath which is attached to, and adsorbed in, the photosensitive material and introduced into the water washing bath, and it is obtained by calculation by immersing the color photosensitive material which has been removed immediately before being immersed in the water washing bath in water to extract the components of the previous bath and then measuring the amount of the components from the previous bath in the extracting liquid.

In this invention, the rate of replenishment of the water bath or the stabilizer bath which replaces the water washing bath is not more than 350 ml, preferably from 90 to 350 ml, and most desirably from 120 to 290 ml, per square meter of color photosensitive material processed.

The pH of the water washing or stabilization bath is from 4 to 10, preferably from 5 to 9, and most desirably from 6.5 to 8.5.

The use of water which has been subjected to a water softening treatment is preferred for the water washing and stabilization baths. Ion exchange resins or reverse osmosis apparatus can be employed for the water softening treatment.

Sodium type strongly acidic cation exchange resins in which the counter ion of the exchange group is sodium are preferred for the ion exchange resins and H-type strongly acidic cation exchange resins, but ammonium type strongly acidic exchange resin can also be used. Moreover, H-type strongly acidic cation exchange resins and OH-type strongly basic anion exchange resins can be used jointly. Copolymers of styrene and divinylbenzene are preferred as the resin base, and those which have a divinylbenzene content at the time of manufacture of from 4 to 15% (w/w) of the whole monomer content are preferred.

The Mitsubishi Kasei products known as "daiyaion SK-1B" and PK-216 are examples of ion exchange resins of this type.

Various types of reverse osmosis apparatus can be used, and those in which a cellulose acetate or polyether-sulfone film is used are suitable for this purpose. Those in which the pressure is not more than 20 $kg/cm^2$ make little noise and are easy to use.

Water in which the calcium and magnesium concentrations have been reduced by means of ion exchange resins or reverse osmosis apparatus of this type are less prone to the propagation of bacteria and fungi and good results can be obtained by combining this with the invention.

Various known compounds can be added in the water washing operation and the stabilization operation with a view to preventing the occurrence of precipitation and stabilizing the washing water. Examples of such substances include chelating agents such as organophosphonic acids, aminopolycarboxylic acids, inorganic phosphoric acid, etc., various disinfectants and biocides which prevent the growth of bacteria, algae and fungi (for example, the compounds disclosed in *J. Antibact. Antifung. Agents,* Vol. 11, No. 5, pages 207 to 223 (1983) and the compounds disclosed in *The Chemistry of Biocides and Fungicides,* by Horiguchi), metal salts as typified by magnesium salts, aluminum salts, bismuth salts, etc., alkali metal salts and ammonium salts, and surfactants for preventing the occurrence of drying marks or irregularities can be added as required.

Alternatively, the compounds disclosed by West in *Phot. Eng. Sci.,* Vol. 6, pages 344 to 359 (1965) may be added. The addition of chelating agents, disinfectants and biocides is particularly effective.

The water washing generally takes the form of a multistage counterflow system with at least two tanks (for example, with from two to nine tanks) in order to economize on washing water. Moreover, a multistage counterflow stabilization processing operation like that disclosed in JP-A-57-8543 can be carried out instead of a water washing operation. Various compounds can be added to the stabilization bath, in addition to the additives described above, with a view to stabilizing the image. For example, various buffers (for example, combinations of borates, metaborates, borax, phosphates, carbonates, potassium hydroxide, sodium hydroxide, aqueous ammonia, monocarboxylic acids, dicarboxylic acids, polycarboxylic acids, etc., can be used) can be added for adjusting the pH of the film (for example, pH from 3 to 9), and aldehydes such as formalin, etc., can be added. Other additives, such as chelating agents (inorganic phosphoric acid, aminopolycarboxylic acids, organophosphonic acids, aminopolyphosphonic acids, phosphonocarboxylic acids, etc.), disinfectants, biocides (thiazole-based compounds, isothiazole-based compounds, halogenated phenols, o-phenylphenol, sulfanilamide, benzotriazole, etc.), surfactants, fluorescent whiteners, film hardening metal salts, etc., can also be used, and two or more of these compounds can be used jointly for the same or different purposes.

Furthermore, the addition of various ammonium salts, such as ammonium chloride, ammonium nitrate, ammonium sulfate, ammonium phosphate, ammonium sulfite, ammonium thiosulfate, etc., as an agent for adjusting the pH of the processed film is desirable for improving the storage properties of the image.

The water washing and stabilizing time in this invention differs according to the type of sensitive material and the processing conditions, but a time of from 20 seconds to 3 minutes is preferred and a time of from 30 seconds to 2 minutes 20 seconds is especially desirable.

The various processing baths in this invention can be used at a temperature of from 10° C. to 50° C. The standard temperature is from 28° C. to 38° C., but the processing can be accelerated and the processing time can be shortened by using higher temperatures, while improved picture quality and improved stability of the processing baths can be achieved by using lower temperature.

Further, each processing time can be made shorter than the standard time within the range where it has no adverse effect, as required, for the purpose of increasing the speed of processing.

Also, when carrying out continuous processing, replenishers can be used for each processing bath and a constant finish can be achieved by preventing fluctuations in bath compositions.

Heaters, temperature sensors, liquid level sensors, circulating pumps, filters, various floating lids, various squeegees, etc., can be established, as required, in each processing bath.

EXAMPLE

The invention is described by means of Examples below, but it is not limited by these examples.

EXAMPLE 1

A color photographic material was prepared by the lamination coating of the first to the fourteenth layers indicated below onto one surface (surface 1) of a paper support (thickness: 100 μm) which had been laminated on surface 1 with a polyethylene 25 μm thick and on the opposite side (surface 2) with a polyethylene 20 μm thick, and the lamination coating of the fifteenth and sixteenth layers indicated below was done onto surface 2 of the support. The polyethylene on surface 1 on which the first layer was coated contained Titan White (4.0 g/m$^2$) as a white pigment and a trace of ultramarine (0.001 g/m$^2$ blue dye.

Composition of the Photosensitive Layer

The components and the coated weights in units of grams per square meter are indicated below. Moreover, the amount of silver halide coated is shown (calculation as silver). The emulsion used in each layer was prepared in accordance with the method used to prepare Emulsion EM-1. However, the emulsion of the fourteenth layer was a Lippmann emulsion of which the surface had not been chemically sensitized. The Lippmann emulsion is a fine particulate silver halide emulsion having a grain size of 0.07 μm and comprising 99 mol % of AgBr and 1 mol % of AgI.

| | |
|---|---|
| First Layer: Antihalation Layer | |
| Black colloidal silver (average grain size: 0.04 μm) | 0.10 |
| Gelatin | 1.30 |
| Second Layer: Intermediate Layer | |
| Gelatin | 0.70 |
| Third Layer: Low Speed Red-Sensitive Layer | |
| Silver bromie which had been spectrally Sensitized with red sensitizing dyes (ExS-1, 2, 3) (average grain size: 0.3 μm, size distribution (variation coefficient): 8%, octahedral) | 0.06 |
| Silver chlorobromide which had been spectrally sensitized with red sensitizing dyes (ExS-1, 2, 3 in molar ration of 5/70/25) (5 mol % silver chloride, average grain size: 0.45 μm, size distribution: 10%, octahedral) | 0.10 |
| Gelatin | 1.00 |
| Cyan coupler (ExC-1) | 0.11 |
| Cyan coupler (ExC-2) | 0.10 |
| Anti-color-fading agent (equal amounts of Cpd-2, 3, 4 and 13) | 0.12 |
| Coupler dispersion medium (Cpd-5) | 0.03 |
| Coupler solvent (equal amounts of | 0.06 |

-continued

| | |
|---|---|
| Solv-7, 2 and 3) | |
| Fourth Layer: High Speed Red-Sensitive Layer | |
| Silver bromide which had been spectrally sensitized with red sensitizing dyes (ExS-1, 2, 3 in molar ratio of 5/70/25) (average grain size: 0.60 μm, size distribution: 15%, octahedral) | 0.14 |
| Gelatin | 1.00 |
| Cyan coupler (ExC-1) | 0.15 |
| Cyan coupler (ExC-2) | 0.15 |
| Anti-color-fading agent (equal weight of Cpd-2, 3, 4 and 13) | 0.15 |
| Coupler dispersion medium (Cpd-5) | 0.03 |
| Coupler solvent (equal amounts of Solv-7, 2 and 3) | 0.10 |
| Fifth Layer: Intermediate Layer | |
| Gelatin | 1.00 |
| Anti-color-mixing agent (Cpd-7) | 0.08 |
| Anti-color-mixing agent solvent (equal amounts of Cpd-4 and 5) | 0.16 |
| Polymer latex (Cpd-8) | 0.10 |
| Sixth Layer: Low Speed Green-Sensitive Layer | |
| Silver bromide which had been spectrally sensitized with a green sensitizing dye (Exs-3) (sic) (average grain size: 0.25 μm, grain size distribution: 8%, octahedral) | 0.04 |
| Silver bromide which had been spectrally sensitized with green sensitizing dyes (ExS-3, 4) (average grain size: 0.45 μm, grain size distribution: 11% octahedral) | 0.06 |
| Gelatin | 0.80 |
| Magenta coupler (ExM-1) | 0.11 |
| Anti-color-fading-agent (Cpd-9) | 0.10 |
| Anti-staining agent (equal amounts of Cpd-10 and 22) | 0.014 |
| Anti-staining agent (Cpd-23) | 0.001 |
| Anti-staining agent (Cpd-12) | 0.01 |
| Coupler dispersion medium (Cpd-5) | 0.05 |
| Coupler solvent (equal amounts of Solv-4 and 6) | 0.15 |
| Seventh Layer: High Speed Green-Sensitive Layer | |
| Silver bromide which hd been spectrally sensitized with green sensitizing dyes (ExS-3, 4) (average grain size: 0.8 μm, grain size distribution: 16%, octahedral) | 0.10 |
| Gelatin | 0.80 |
| Magenta coupler (ExM-1) | 0.11 |
| Anti-color-fading agent (Cpd-9) | 0.10 |
| Anti-staining agent (equal amounts of Cpd-10 and 22) | 0.013 |
| Anti-staining agent (Cpd-23) | 0.001 |
| Anti-staining agent (Cpd-12) | 0.01 |
| Coupler dispersion medium (Cpd-5) | 0.05 |
| Coupler solvent (equal amounts of Solv-4 and 6) | 0.15 |
| Eighth Layer: Intermediate Layer | |
| Same as the fifth layer | |
| Ninth Layer: Yellow Filter Layer | |
| Yellow colloidal silver (average grain size: 50 Å) | 0.20 |
| Gelatin | 1.00 |
| Anti-color-mixing agent (Cpd-7) | 0.06 |
| Anti-color-mixing agent solvent (equal amounts of Solv-4 and 5) | 0.15 |
| Polymer latex (Cpd-8) | 0.10 |
| Tenth Layer: Intermediate Layer | |
| Same as the fifth layer | |
| Eleventh Layer: Low Speed Blue-Sensitive Layer | |
| Silver bromide which had been spectrally sensitized with blue sensitizing dyes (ExS-5, 6 in molar ratio of 20/80) (average grain size distribution: 8%, octahedral) | 0.07 |
| Silver bromide which had been spectrally sensitized with blue sensitizing dyes (ExS-5, 6 in molar ratio of 20/80) (average grain size: 0.60 μm, grain size distribution: 14%, octahedral) | 0.10 |
| Gelatin | 0.50 |
| Yellow coupler (ExY-1) | 0.22 |
| Anti-staining agent (Cpd-11) | 0.001 |
| Anti-color-fading agent (Cpd-6) | 0.10 |
| Coupler dispersion medium (Cpd-5) | 0.05 |

-continued

| | |
|---|---|
| Coupler solvent (Solv-2) | 0.05 |
| Twelfth Layer: High Speed Blue-Sensitive Layer | |
| Silver bromide which had been spectrally sensitized with blue sensitizing dyes (ExS-5, 6 in molar ratio of 20/80) (average grain size: 1.2 μm, grain size distribution: 21%, octahedral) | 0.25 |
| Gelatin | 1.00 |
| Yellow coupler (ExY-1) | 0.41 |
| Anti-staining agent (Cpd-11) | 0.002 |
| Anti-color-fading agent (Cpd-6) | 0.10 |
| Coupler dispersion medium (Cpd-5) | 0.05 |
| Coupler solvent (Solv-2) | 0.10 |
| Thirteenth Layer: Ultraviolet Absorbing Layer | |
| Gelatin | 1.50 |
| Ultraviolet absorber (equal amounts of Cpd-1, 3 and 13) | 1.00 |
| Anti-color-mixing agent (equal amounts of Cpd-6 and 14) | 0.06 |
| Dispersion medium (Cpd-5) | 0.05 |
| Ultraviolet absorber solvent (equal amounts of Solv-1 and 2) | 0.15 |
| Antiirradiation dye (equal amounts of Cpd-17 and 18) | 0.02 |
| Fourteenth Layer: Protective Layer | |
| Fine grain silver chlorobromide (silver chloride: 97 mol %, average size: 0.2 μm) | 0.05 |
| Acrylic-modified poly(vinyl alcohol) copolymer (degree of modification: 17%, molecular weight: 50,000) | 0.02 |
| Equal quantities of poly(methyl methacrylate) grains (average grain size: 2.4 μm) and silicon oxide (average grain size: 5 μm) | 0.05 |
| Gelatin | 1.50 |
| Gelatin hardening agent (H-1) | 0.17 |
| Fifteenth Layer: Backing Layer | |
| Gelatin | 2.50 |
| Sixteenth Layer: Reverse Side Protecting Layer | |
| Equal amounts of poly(methyl methacrylate) grains (average grain size: 2.4 μm) and silicon oxide (average grain size; 5 μm) | 0.05 |
| Gelatin | 2.00 |
| Gelatin hardening agent (H-1) | 0.11 |

Preparation of Emulsion EM-1

Aqueous solutions of potassium bromide and silver nitrate were added simultaneously over a period of 15 minutes at a temperature of 75° C. with vigorous stirring to an aqueous gelatin solution and octahedral silver bromide grains of an average grain size 0.40 μm were obtained. Next, 3,4-dimethyl-1,3-thiazolin-2-thione, sodium thiosulfate and chloroauric acid (tetrahydrate) were added sequentially in amounts of 0.3 g, 6 mg and 7 mg per mol of silver, respectively, to the emulsion and chemical sensitization was carried out by heating to 75° C. for a period of 80 minutes. The grains obtained in this way were then used as cores and grown under the same precipitation conditions as used on the first precipitation, whereupon a core/shell silver bromide emulsion consisting of a monodispersion of octahedral grains of a final average grain size of 0.7 μm was obtained. The variation coefficient of the grain size was about 10%. Sodium thiosulfate and chloroauric acid (tetrahydrate) were added in amounts of 1.5 mg and 1.5 mg per mol of silver, respectively, to this emulsion and the emulsion was chemically sensitized by heating at 0° C. for a period of 60 minutes, whereupon an internal latent image type silver halide emulsion was obtained.

ExZK-1 was used in an amount of $10^{-3}$ wt % with respect to the weight of silver halide as a nucleating agent in each photosensitive layer. Moreover, "Alkanol XC" (Du Pont Co.) and sodium alkylbenzenesulfonate were used as emulsification and dispersion promotors and succinate esters and "Magefac F-120" (made by the Dainippon Ink Co.) were used as coating promotors in each layer. (Cpd-19, 20, 21) were used as stabilizers in each of the silver halide and colloidal silver-containing layers. The compounds used in the example are indicated below.

ExS-1

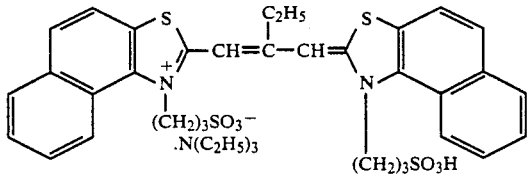

ExS-2

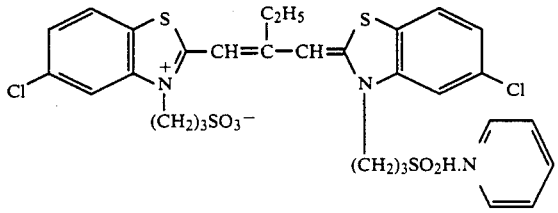

ExS-3

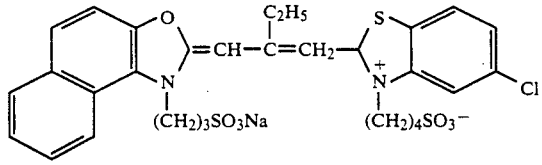

ExS-4

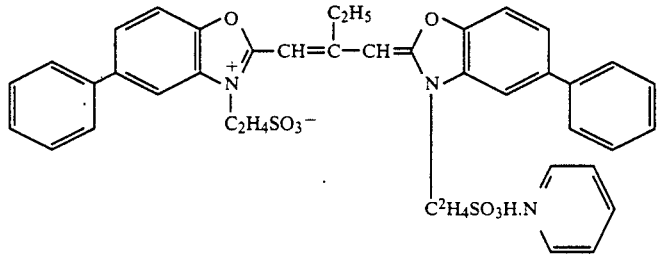

ExS-5

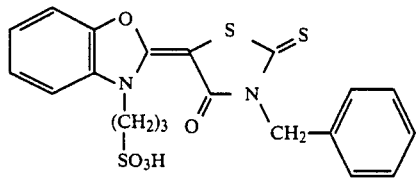

ExS-6

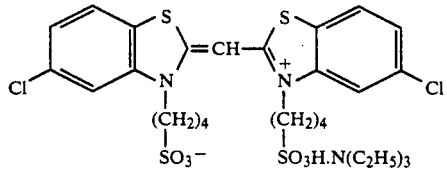

Cpd-1

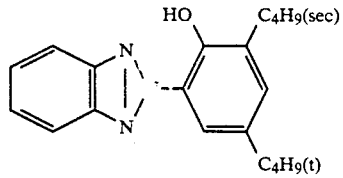

-continued
Cpd-2
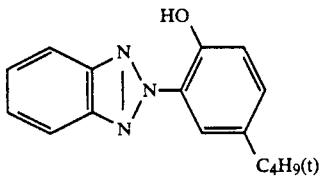
Cpd-3
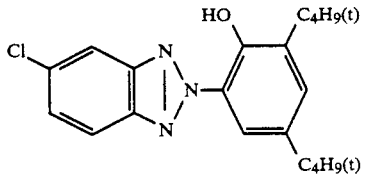
Cpd-4
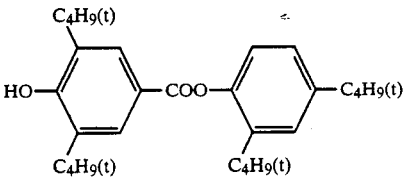
Cpd-5
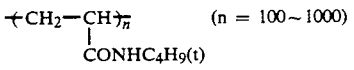
(n = 100~1000)
Cpd-6
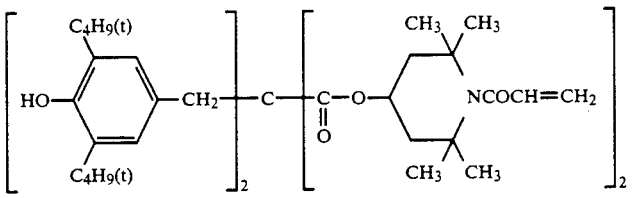
Cpd-7
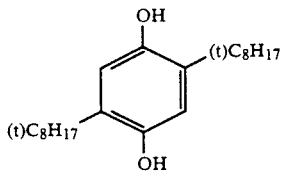
Cpd-8
Poly(ethyl acrylate)
Cpd-9
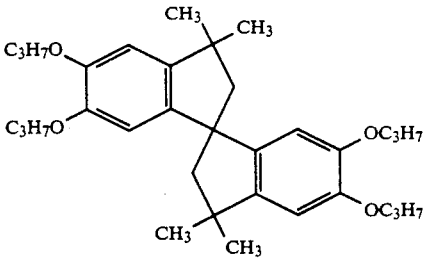
Cpd-10
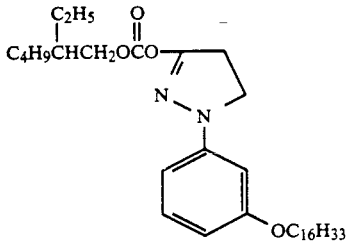

-continued
Cpd-11
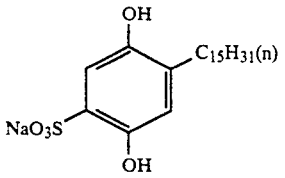
Cpd-12
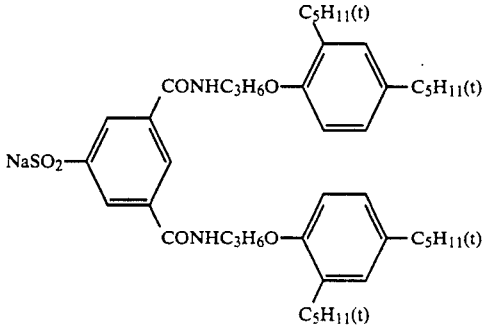
Cpd-13
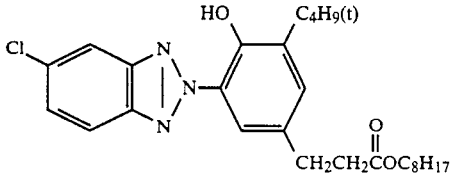
Cpd-14
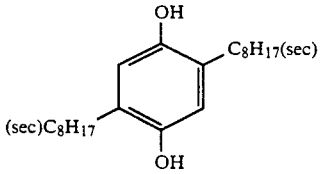
Cpd-15
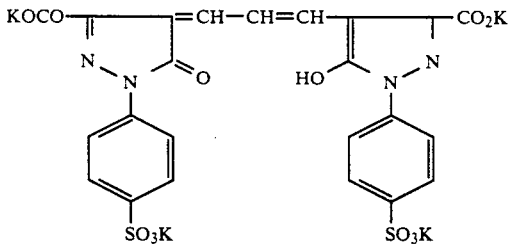
Cpd-16
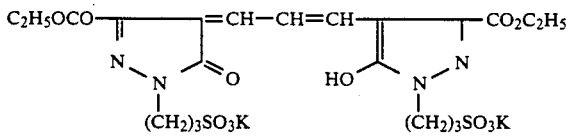
Cpd-17
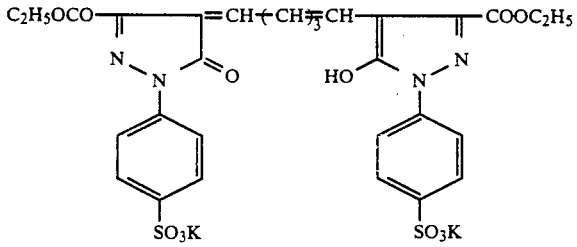

-continued
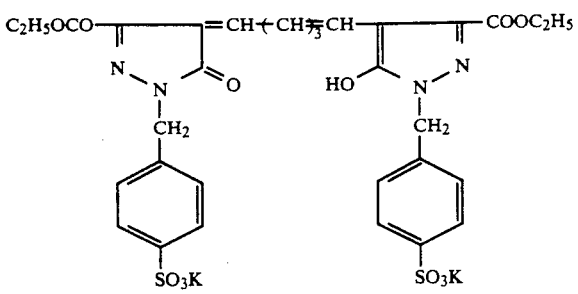
Cpd-18
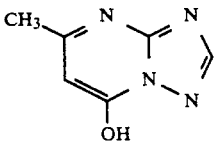
Cpd-19
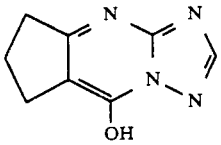
Cpd-20
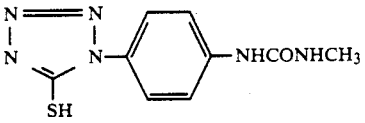
Cpd-21
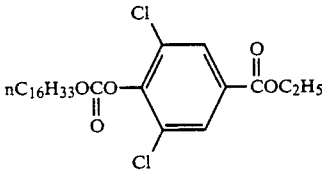
Cpd-22
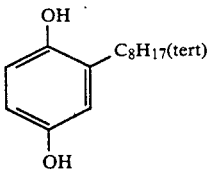
Cpd-23
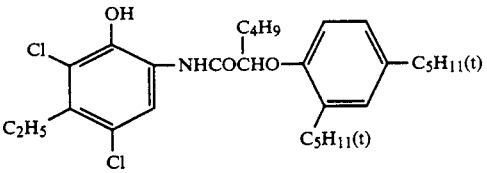
EXC-1
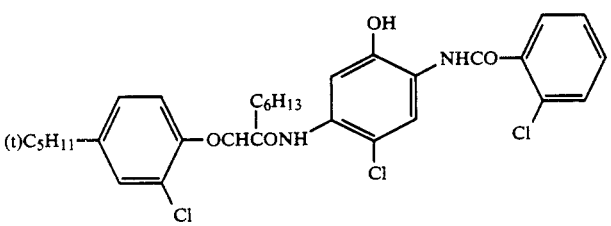
EXC-2
Compounds shown in Table 1
EXM-1

-continued

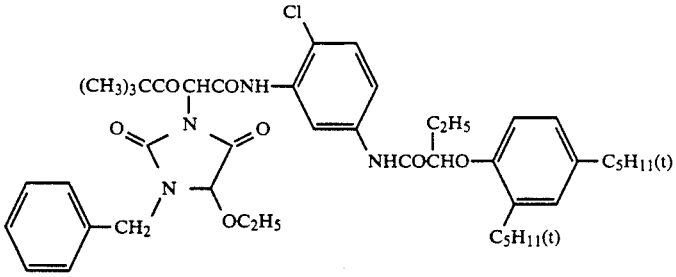

ExY-1

| | |
|---|---|
| Di(2-ethylhexyl) Phthalate | Solv-1 |
| Trinonyl Phosphate | Solv-2 |
| Di(3-methylhexyl) Phthalate | Solv-3 |
| Tricresyl Phosphate | Solv-4 |
| Dibutyl Phthalate | Solv-5 |
| Trioctyl Phosphate | Solv-6 |
| Di(2-ethylhexyl) Sebacate | Solv-7 |
| 1,2-Bis(vinylsulfonylacetamido)ethane | H-1 |
| 7-[3-(5-Mercaptotetrazol-1-yl)benzamido]-10-propargyl-1,2,3,4-tetrahydroacridinium Perchlorate | ExZK-1 |

| Processing Operation A: | Time | Temperature (°C.) |
|---|---|---|
| Color Development | 1 min 30 sec | 38 |
| Bleach-Fix | 40 sec | 35 |
| Water Wash (1) | 40 sec | 30–36 |
| Water Wash (2) | 40 sec | 30–36 |
| Water Wash (3) | 15 sec | |
| Drying | 30 sec | 75–80 |

The replenishment system for the washing water was a counterflow replenishment system in which water washing bath (3) was replenished, the overflow from water washing bath (3) was introduced into water washing bath (2) and the overflow from water washing bath (2) was introduced into water washing bath (1). The carry-over from the preceding bath by the photosensitive material at this time was 35 ml/m$^2$ and so the replenishment factor (a value obtained by dividing the amount of the replenisher per unit area of the photographic material by the amount of the liquid per unit area of the photographic material, carried over with the photographic material from the previous bath) was 9.1 times.

| Color Development Bath: | Tank Solution |
|---|---|
| Ethylenediaminetetrakismethylene-phosphonic Acid | 0.5 g |
| Diethylene Glycol | 8.0 g |
| Benzyl Alcohol | 12.0 g |
| Sodium Bromide | 0.6 g |
| Sodium Chloride | 0.5 g |
| Sodium Sulfite | 2.0 g |
| N,N-Diethylhydroxylamine | 3.5 g |
| Triethylenediamine(1,4-diazabicyclo-[2,2,2]octane) | 3.5 g |
| 3-Methyl-4-amino-N-ethyl-N-(β-methanesulfonamidoethyl)aniline Sulfate | 5.5 g |
| Potassium Carbonate | 30.0 g |
| Fluorescent Whitener, Whitex 4 (Sumitomo Chemical Inc.) | 1.0 g |
| Pure water to make | 1,000 ml |
| pH | 10.50 |
| The pH was adjusted using sodium hydroxide or hydrochloric acid. | |
| **Bleach-Fix Bath:** | **Tank Solution = Replenisher** |
| Ammonium Thiosulfate | 100 g |
| Sodium Bisulfite | 21.0 g |
| Ethylenediaminetetraacetic Acid Iron(III) Ammonium Salt (dihydrate) | 50.0 g |
| Ethylenediaminetetraacetic Acid Disodium Salt (dihydrate) | 5.0 g |
| Pure water to make | 1,000 ml |
| pH | 6.3 |
| The pH was adjusted with aqueous ammonia or hydrochloric acid. | |
| **Wash Water:** | |
| Pure water was used (tank solution). | |

Pure water signifies town water from which all the cations other than hydrogen ions and all anions other than hydroxyl ions had been removed to a concentration not exceeding 1 ppm, using an ion exchange process.

The color printing papers prepared in the way described above were stored (incubated) for 3 days at 45° C., 80% RH, and then subjected to a wedge exposure (0.1 second, halogen lamp, 3,200° K., 10 CMS), after which they were processed using Processing Operation A. The magenta image densities obtained were measured and the results are shown in Table 1.

TABLE 1

| No. | Magenta Coupler | Nucleating Agent | $D_{max}$ | $D_{min}$ |
|---|---|---|---|---|
| 1 | I-4 | A-6 | 2.4 | 0.10 |
| 2 | " | A-12 | 2.4 | 0.01 |
| 3 | " | A-27 | 2.3 | 0.10 |
| 4 | " | — | 1.5 | 0.12 |
| 5 | I-33 | A-7 | 2.4 | 0.01 |
| 6 | " | A-19 | 2.4 | 0.01 |
| 7 | " | A-31 | 2.3 | 0.10 |
| 8 | " | — | 1.5 | 0.12 |

TABLE 1-continued

| No. | Magenta Coupler | Nucleating Agent | $D_{max}$ | $D_{min}$ |
|---|---|---|---|---|
| 9 | M-A* | — | 1.8 | 0.13 |

*The structural formula of M-A is indicated below:

M-A

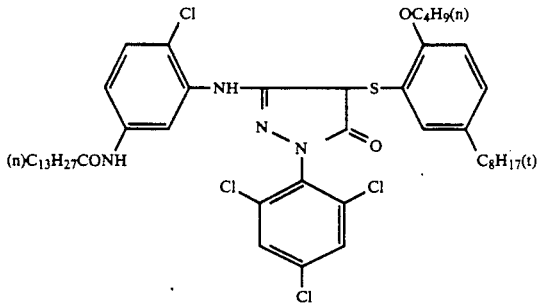

The amount of the aforementioned nucleating agents added was $1.25\times10^{-4}$ mol per mol of silver.

With Sample Nos. 1 to 3 and 5 to 7 which contained a nucleation accelerator and a magenta coupler of this invention, values of $D_{max}$ were higher than in the case of Sample Nos. 4, 8 and 9, which are comparative examples, the values of $D_{min}$ were lower, and the invention materials are preferred.

Furthermore, on photographing a magenta color chart, Sample Nos. 1 to 8 in which magenta couplers of this invention had been used had a higher hue of color in the red system than Sample No. 9 in which a comparative magenta coupler was used.

EXAMPLE 2

Similar results were obtained on repeating Example 1 except that Compounds I-2, I-6, I-16, I-22, I-31, I-32 and I-33 were each used in place of Magenta Coupler I-4.

EXAMPLE 3

| Processing Operation B: | Time (sec) | Temperature (°C.) |
|---|---|---|
| Color Development | 70 | 38 |
| Bleach-Fix | 30 | 38 |
| Water Wash (1) | 30 | 38 |
| Water Wash (2) | 30 | 38 |

At this time the replenishment factor for the water washing bath was 8.6 times.

| | Parent Bath |
|---|---|
| Color Development Bath: | |
| Diethylenetriaminepentaaetic Acid | 0.5 g |
| 1-Hydroxyethylidene-1,1-diphosphonic Acid | 0.5 g |
| Diethylene Glycol | 8.0 g |
| Benzyl Alcohol | 9.0 g |
| Sodium Bromide | 0.7 g |
| Sodium Chloride | 0.5 g |
| Sodium Sulfide | 2.0 g |
| Hydroxylamine Sulfate | 2.8 g |
| 3-Methyl-4-amino-N-ethyl-N-(β-hydroxyethyl)aniline Sulfate | 4.0 g |
| Potassium Carbonate | 30.0 g |
| Fluorescent Whitener (stilbene-based) | 1.0 g |
| Pure water to make | 1,000 ml |
| pH | 10.50 |
| The pH was adjusted using sodium hydroxide or hydrochloric acid. | |
| Bleach-Fix Bath: | |

-continued

| | Parent Bath |
|---|---|
| Ammonium Thiosulfate | 77 g |
| Sodium Bisulfite | 14.0 g |
| Ethylenediaminetetraacetic Acid Iron(III) Ammonium Salt (dihydrate) | 40.0 g |
| Ethylenediaminetetraacetic Acid Disodium Salt (dihydrate) | 4.0 g |
| 2-Mercapto-1,3,4-triazole | 0.5 g |
| Pure water to make | 1,000 ml |
| pH | 7.0 |
| The pH was adjusted with aqueous ammonia or hydrochloric acid. | |
| Washing Water: | |
| Pure water was used (parent bath). | |

EXAMPLE 4

Preparation of Emulsion EM-2

A mixed aqueous solution of potassium bromide and sodium chloride and an aqueous silver nitrate solution were added simultaneously over a period of about 14 minutes at a temperature of 65° C. with vigorous stirring to an aqueous gelatin solution to which 0.07 g per mol of silver of 3,4-dimethyl-1,3-thiazolin-2-thione had been added and a monodisperse silver chlorobromide emulsion of average grain size of about 0.23 μm was obtained (silver bromide content: 80 mol %). Next, 61 mg of sodium thiosulfate per mol of silver and 42 mg of chloroauric acid (tetrahydrate) per mol of silver were added to the emulsion and chemical sensitization was carried out by heating to 65° C. for a period of 60 minutes. The silver chlorobromide grains obtained in this way were then used as cores and grown under the same precipitation conditions as used in the first precipitation, whereupon a monodisperse core/shell silver chlorobromide emulsion of a final average grain size of 0.65 μm was obtained (silver bromide content: 70 mol %). The variation coefficient of the grain size was about 12%. Next, 1.5 mg of sodium thiosulfate per mol of silver and 1.5 mg of chloroauric acid (tetrahydrate) per mol of silver were added to the emulsion, chemical sensitization was carried out by heating to 60° C. for a period of 60 minutes, and internal latent image type silver halide Emulsion EM-2 was obtained.

Color print papers were prepared in the same way as in Example 1 except that Emulsion EM-2 and emulsions prepared similarly thereto with the same silver halide composition as EM-2 but having different grain sizes were used in the sixth and seventh layers, and nucleating agent (ExZK-1) was omitted from each photosensitive layer.

The samples were exposed in the same way as in Example 1 and then they were processed using Processing Operation C indicated below. Similar results to those in Example 1 were obtained.

| Processing Operation C: | Time (sec) | Temperature (°C.) |
|---|---|---|
| Color Development*[1] | 135 | 36 |
| Bleach-Fix | 40 | 36 |
| Stabilizing (1) | 40 | 36 |
| Stabilizing (2) | 40 | 36 |
| Drying | 40 | 70 |

*[1]The color development process was carried out with a 15 second fogging exposure of 1 lux starting 15 seconds after immersion in the color development bath.

| | Tank Solution |
|---|---|
| Color Development Bath: | |
| Hydroxyethylamino Diacetic Acid | 0.5 g |
| β-Cyclodextrin | 1.5 g |
| Monoethylene Glycol | 9.0 g |
| Benzyl Alcohol | 9.0 g |
| Monoethanolamine | 2.5 g |
| Sodium Bromide | 2.3 g |
| Sodium Chloride | 5.5 g |
| N,N-Diethylhydroxylamine | 5.9 g |
| 3-Methyl-4-amino-N-ethyl-N-(β-methanesulfonamido)aniline Sulfate | 2.7 g |
| 3-Methyl-4-amino-N-ethyl-N-(β-hydroxyethyl)aniline Sulfate | 4.5 g |
| Potassium Carbonate | 30.0 g |
| Fluorescent Whitener, Whitex 4 (Sumitomo Chemical Inc.) | 1.0 g |
| Pure water to make | 1,000 ml |
| pH | 10.30 |
| The pH was adjusted using sodium hydroxide or hydrochloric acid. | |
| Bleach-Fix Bath: | |
| Ammonium Thiosulfate | 110 g |
| Sodium Bisulfite | 12 g |
| Diethylenetriaminepentaacetic Acid Iron(III) Ammonium Salt | 80 g |
| Diethylenetriaminepentaacetic Acid | 5 g |
| 2-Mercapto-5-amino-1,3,4-thiadiazole | 0.3 g |
| Pure water to make | 1,000 ml |
| pH | 6.80 |
| The pH was adjusted with aqueous ammonia or hydrochloric acid. | |
| Stabilizer Bath: | |
| 1-Hydroxyethylidene-1,1-diphosphonic Acid | 2.7 g |
| o-Phenylphenol | 0.2 g |
| Potassium Chloride | 2.5 g |
| Bismuth Chloride | 1.0 g |
| Zinc Chloride | 0.25 g |
| Sodium Sulfite | 0.3 g |
| Ammonium Sulfate | 4.5 g |
| Fluorescent Whitener, Whitex 4 (Sumitomo Chemical Inc.) | 0.5 g |
| Pure water to make | 1,000 ml |
| pH | 7.2 |
| The pH was adjusted with sodium hydroxide or hydrochloric acid. | |

Effect of the Invention

Direct positive photographic material invention provide images which are suitable for practical purposes in which the color reproduction is excellent and in which whiteness is increased by the high maximum density and a hardening of the gradation in the minimum density parts.

Moreover, the results described above were also maintained after storage under conditions of high temperature and high humidity.

While the invention has been described in detail and with reference to specific embodiments thereof, it will be apparent to one skilled in the art that various changes and modifications can be made therein without departing from the spirit and scope thereof.

What is claimed is:

1. A method of developing a direct positive color photosensitive material comprised of at least one internal latent image silver halide emulsion layer which has not been prefogged on a support and at least one color image forming magenta coupler represented by general formula (I) and at least one nucleation accelerator represented by general formula (II) and/or (III):

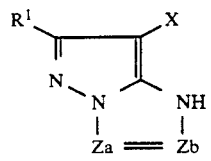

(I)

wherein Za and Zb each represents a

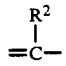

or =N— group, $R^1$ and $R^2$ each represents a hydrogen atom or a substituent group, and X represents a hydrogen atom or a group which can be eliminated by a coupling reaction with the oxidized form of a primary aromatic amine developing agent, where if Za and Zb form a carbon-carbon double bond, said double bond may be a part of an aromatic ring, $R^1$, $R^2$ or X may form dimers or higher polymers;

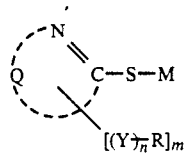

(II)

wherein Q represents a group of atoms required to form a 5- or 6-membered heterocyclic ring, which may be condensed with a carbon aromatic ring or a heterocyclic aromatic ring, Y represents a divalent linking group consisting of one or more atoms selected from a hydrogen atom, a carbon atom, a nitrogen atom, an oxygen atom and a sulfur atom, and R represents an organic group which contains at least one thioether group, amino group, ammonium group, ether group or heterocyclic group, n represents 0 or 1, m represents 0, 1 or 2, and M represents a hydrogen atom, an alkali metal atom, an ammonium group or a group which is cleaved under alkaline conditions;

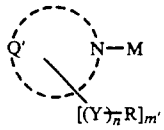

(III)

wherein Q' represents a group of atoms required to form a 5- or 6-membered heterocyclic ring which can form imino silver, Y, R, n and M are the same as for general formula (I) and m' represents 1 or 2, comprising:

developing the material with a color developing solution containing at least one p-phenylenediamine compound and having a pH of from 9 to 10.5 at a temperature of at least 36° C. for up to 2 minutes and 15 seconds.

2. A method as in claim 1, wherein the magenta coupler represented by general formula (I) is one represented by general formulae (Ia) or (Ib):

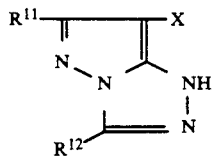

(Ia)

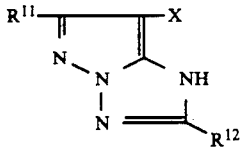

(Ib)

wherein $R^{11}$ and $R^{12}$ may be the same or different, and each represents a hydrogen atom, a halogen atom, an alkyl group, an aryl group, a heterocyclic group, a cyano group, an alkoxy group an aryloxy group, a heterocyclic oxy group, an acyloxy group, a carbamoyloxy group, a silyloxy group, a sulfonyloxy group, an acylamino group, an anilino group, a ureido group, an imido group, a sulfamoylamino group, a carbamoyl group, an alkylthio group, an arylthio group, a heterocyclic thio group, an alkoxycarbonylamino group, an aryloxycarbonylamino group, a sulfonamido group, a carbamoyl group, an acyl group, a sulfamoyl group, a sulfonyl group, a sulfinyl group, an alkoxycarbonyl group or an aryloxycarbonyl group, X represents a hydrogen atom, a halogen atom, a carboxyl group or a group which undergoes coupling elimination, being a group which is bonded to the carbon atom at the coupling position via an oxygen atom, a nitrogen atom or a sulfur atom.

3. A method as in claim 1, wherein, in general formula (II), the heterocyclic ring represented by Q is selected from the group consisting of triazoles, imidazoles, thiadiazoles, oxadiazoles, selenadiazoles, oxazoles, thazoles, benzoxazoles, benzothiazoles, benzimidazoles, and pyrimidines, the divalent linking group represented by Y is selected from the group consisting of —S—, —O—,

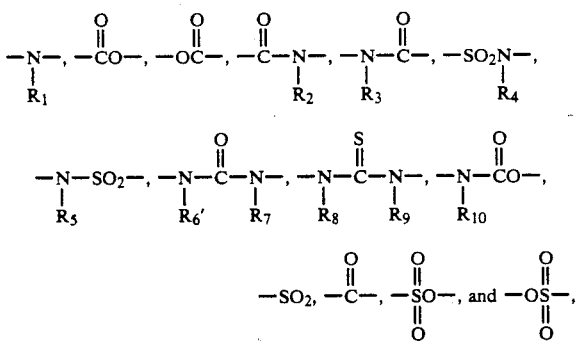

wherein $R_1$, $R_2$, $R_3$, $R_4$, $R_5$, $R_6$, $R_7$, $R_8$, and $R_9$ and $R_{10}$ each represents a hydrogen atom, a substituted or unsubstituted alkyl group, a substituted or unsubstituted aryl group, a substituted or unsubstituted alkenyl group, or a substituted or unsubstituted aralkyl group; the organic group represented by R is selected from the group consisting of a hydrochloride of a dimethylaminoethyl group, aminoethyl group, diethylaminoethyl group, dibutylaminoethyl group, or dimethylaminopropyl group; a dimethylamioethyl group, 4-diemthylamiophenyl group, 4-dimethylaminobenzyl group, methylthioethyl group, ethylthiopropyl group, 4-methylthio-3-cyanophenyl group, methylthiomethyl group, trimethylammonioethyl group, methoxyethyl group, methoxyethoxyethoxyethyl group, methoxyethylthioethyl group, 3,4-dimethoxyphenyl group, 3-chloro-4-methoxyphenyl group, morpholinoethyl group, 1-imidazolylethyl group, morpholinoethylthioethyl group, pyrrolidinoethyl group, piperidinopropyl group, 2-pyridylmethyl group, 2-(1-imidazolyl)ethylthioethyl group, pyrazolyethyl group, triazolylethyl group, and methoxyethoxyethoxyethoxycarbonylaminoethyl group; the alkali metal atom represented by M is a sodium atom or a potassium atom, the ammonium group represented by M is a trimethylammonium group or a dimethylbenzylammonium group, or the group represented by M is selected from an acetyl group, a cyanoethyl group and a methanesulfonyl group; and in general formula (III), Y, R, n, and M have the same meaning as in general formula (II), the heterocyclic ring represented by Q, is selected from the group consisting of an imidazole, a benzimidazole, a benzotriazole, a benzoxazole, a benzothiazole, an imidazole, a thiazole, an oxazole, a triazole, a tetrazole, a tetraazaidene, a triazaindene, a diazaindene, a pyriazole, and an indole.

4. A method as in claim 1, wherein the amount added of the magenta coupler is from $1\times10^{-3}$ to $5\times10^{-1}$ mol per mol of silver in the emulsion layer.

5. A method as in claim 1, wherein said p-phenylenediamine compound is selected from the group consisting of 3-methyl-4-amino-N,N-diethylaniline, 3-methyl-4-amino-N-ethyl-N-β-hydroxyethylaniline, 3-methyl-4-amino-N-ethyl-N-β-methanesulfonamidoethylaniline, 3-methyl-4-amino-N-ethyl-N-β-methoxyethylaniline and the hydrochloride, sulfate and p-toluenesulfonate salts of each of the compounds in said group.

6. A method for developing a direct positive color photosensitive material comprised of at least one internal latent image core/shell pure silver bromide emulsion layer which has not been prefogged on a support and at least one color image-forming magenta coupler represented by general formula (I) and at least one nucleation accelerator represented by general formula (II) and/or (III):

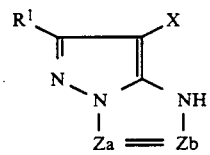

(I)

wherein Za and Zb each represents a

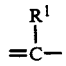

or =N— group, $R^1$ and $R^2$ each represents a hydrogen atom or a substituent group, and X represents a hydrogen atom or a group which can be eliminated by a coupling reaction with the oxidized form of a primary aromatic amine developing agent, where if Za and Zb form a carbon-carbon double bond, said double bond may be a part of an aromatic ring, $R^1$, $R^2$ or X may form dimers or higher polymers;

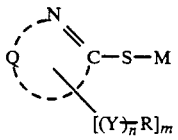

(II)

wherein Q represents a group of atoms required to form a 5- or 6-membered heterocyclic ring, which may be condensed with a carbon aromatic ring or a heterocyclic aromatic ring, Y represents a divalent linking group consisting of one or more atoms selected from a hydrogen atom, a carbon atom, a nitrogen atom, an oxygen atom and a sulfur atom, and R represents an organic group which contains at least one thioether group, amino group, ammonium group, ether group or heterocyclic group, n represents 0 or 1, m represents 0, 1 or 2, and M represents a hydrogen atom, an alkali metal atom, an ammonium group or a group which is cleaved under alkaline conditions;

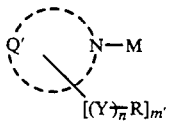

(III)

wherein Q′ represents a group of atoms required to form a 5- or 6-membered heterocyclic ring which can form imino silver, Y, R, n and M are the same as for general formula (I) and m′ represents 1 or 2, comprising:

developing the material with a color developing solution containing at least one p-phenylenediamine compound at a temperature of at least 36° C. for up to 2 minutes, 15 seconds.

7. A method as in claim 6, wherein the magenta coupler represented by general formula (I) is one represented by general formulae (Ia) or (Ib):

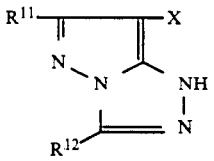

(Ia)

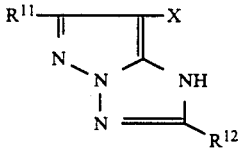

(Ib)

wherein $R^{11}$ and $R^{12}$ may be the same or different, and each represents a hydrogen atom, a halogen atom, an alkyl group, an aryl group, a heterocyclic group, a cyano group, an alkoxy group, ar aryloxy group, a heterocyclic oxy group, an acyloxy group, a carbamoyloxy group, a silyloxy group, a sulfonyloxy group, an arylamino group, an anilino group, a ureido group, an imido group, a sulfamoylamino group, a carbamoylamino group, an alkylthio group, an arylthio group, a heterocyclic thio group, an alkoxycarbonylamino group, an aryloxycarbonylamino group, a sulfonamido group, a carbamoyl group, an acyl group, a sulfamoyl group, a sulfonyl group, a sulfinyl group, an alkoxycarbonyl group or an aryloxycarbonyl group, X represents a hydrogen atom, a halogen atom, a carboxyl group or a group which undergoes coupling elimination, being a group which is bonded to the carbon atom at the coupling position via an oxygen atom, a nitrogen atom or a sulfur atom.

8. A method as in claim 6, wherein, in general formula (II), the heterocyclic ring represented by Q is selected from the group consisting of triazoles, imidazoles, thiadiazoles, oxadiazoles, selenadiazoles, oxazoles, thiazoles, benzoxazoles, benzothiazoles, benzimidazoles, and pyrimidines, the divalent linking group represented by Y is selected from the group consisting of —S—, —O—,

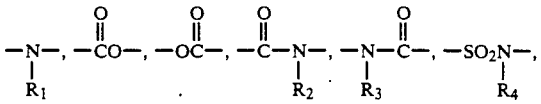

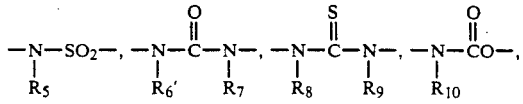

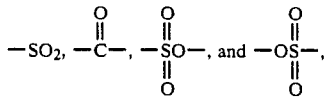

wherein $R_1$, $R_2$, $R_3$, $R_4$, $R_5$, $R_6$, $R_7$, $R_8$, and $R_9$ and $R_{10}$ each represents a hydrogen atom, a substituted or unsubstituted alkyl group, a substituted or unsubstituted aryl group, a substituted or unsubstituted alkenyl group, or a substituted or unsubstituted aralkyl group; the organic group represented by R is selected from the group consisting of a hydrochloride of a dimethylaminoaminoethyl group, or dimethylaminopropyl group; a dimethylaminoethylthioethyl group, 4 diemthylaminophenyl group, 4-dimethylaminobenzyl group, methylthioethyl group, ethylthiopropyl group, 4-methylthio-3-cyanophenyl group, methylthiomethyl group, trimethylammonioethyl group, methoxyethyl group, methoxyethoxyethoxyethyl group, methoxyethylthioethyl group, 3,4-dimethoxyphenyl group, 3-chloro-4-methoxyphenyl group, morpholinoethyl group, 1-imidazolylethyl group, morpholinoethylthioethyl group, pyrrolidinoethyl group, piperidinopropyl group, 2-pyridylmethyl group, 2-(1-imidazolyl)ethylthioethyl group, pyrazolyethyl group, triazolylethyl group, and methoxyethoxyethoxyethoxycarbonylaminoethyl group; the alkali metal atom represented by M is a sodium atom or a potassium atom, the ammonium group represented by M is a trimethylammonium group or a dimethylbenzylammonium group, or the group represented by M is selected from an acetyl group, a cyanoethyl group and a methanesulfonyl group; and in general formula (III), Y, R, n, and M have the same meaning as in general formula (II), the heterocyclic ring represented by Q′ is selected from the group consisting of an imidazole, a benzimidazole, a benzotriazole, a benzoxazole, a benzothiazole, an imidazole, a thiazole, an oxazole, a triazole, a tetrazole, a tetraazaindene, a triazaindene, a diazaindene, a pyrazole, and an indole.

9. A method as in claim 6, wherein the amount added of the magenta coupler is from $1\times10^{-3}$ to $5\times10^{-1}$ mol per mol of silver in the emulsion layer.

10. A method as in claim 6, wherein said p-phenylenediamine compound is selected from the group consisting of 3-methyl-4-amino-N,N-diethylaniline, 3-methyl 4-amino-N-ethyl-N-β-hydroxyethylaniline, 3-methyl-4-amino-N-ethyl-N-β-methanesulfonamidoethylaniline, 3-methyl-4-amino-N-ethyl-N-β-methoxyethylaniline and the hydrochloride, sulfate and p-toluenesulfonate salts of each of the compounds in said group.

* * * * *